(12) United States Patent
Song

(10) Patent No.: US 8,190,943 B2
(45) Date of Patent: May 29, 2012

(54) SYSTOLIC MERGE SORTER

(75) Inventor: William S. Song, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 635 days.

(21) Appl. No.: 12/403,903

(22) Filed: Mar. 13, 2009

(65) Prior Publication Data

US 2010/0235674 A1 Sep. 16, 2010

(51) Int. Cl.
*G06F 1/00* (2006.01)
(52) U.S. Cl. .................. 713/500; 713/600; 370/412
(58) Field of Classification Search .......... 713/500–600; 370/412
See application file for complete search history.

(56) References Cited

U.S. PATENT DOCUMENTS

| | | | |
|---|---|---|---|
| 4,078,260 A | 3/1978 | Chen et al. | |
| 4,799,152 A | 1/1989 | Chuang et al. | |
| 5,079,736 A | 1/1992 | Kitsuregawa et al. | |
| 5,535,384 A * | 7/1996 | Kasahara | 707/752 |
| 5,855,016 A | 12/1998 | Edem et al. | |
| 6,856,270 B1 * | 2/2005 | Farmer et al. | 341/161 |
| 6,879,596 B1 | 4/2005 | Dooply | |
| 2007/0214445 A1 | 9/2007 | Dehon et al. | |

OTHER PUBLICATIONS

International Preliminary Report on Patentability, International Application No. PCT/US2010/024892, Mail date of Sep. 13, 2011, 5 pages.

Attalah, Mikhail et al., Sorting with Efficient Use of Special-Purpose Sorters, Information Processing Letters, Feb. 15, 1998, 13-15, vol. 24 No. 1, Elsevier Science Publishers, North-Holland.
Qureshi, Kalim, A Practical Performance Comparison of Parallel Sorting Algorithms on Homogenous Network of Workstations, PDPTA, 2006, 615-619.
Beigle, Richard et al., Sorting n Objects with a K-Sorter, IEEE Transactions on Computers, May 1990, pp. 714-716, vol. 39, No. 5, IEEE Computer Society, Los Alamitos, CA, USA.
Batcher, K.E., Sorting Networks and Their Applications, Spring Joint Computer Conference, 1968, 307-314.
Colavita, A. A., SORTCHIP: A VLSI Implementation of a Hardware Algorithm for Continuous Data Sorting,IEEE Journal of Solid-State Circuits, Jun. 2003, pp. 1076-1079, vol. 38 No. 6, IEEE Solid-State Circuits Society.
Greene, William A, k-way merging and k-ary sorts, Proceedings of the 1991 Symposium on Applied Computing, Apr. 3-5, 1991, pp. 197-206.

(Continued)

*Primary Examiner* — Brian Misiura
*Assistant Examiner* — Kim Huynh
(74) *Attorney, Agent, or Firm* — Guerin & Rodriguez, LLP; Michael A. Rodriguez

(57) ABSTRACT

A sorter system includes a clock continuously generating a series of clock signals, a systolic array circuit, and control circuitry in communication with serial access memory that stores data items of a sequence to be sorted and with the systolic array circuit to supply thereto data items as input and to receive therefrom data items as output. The systolic array circuit includes at least one processing module and K−1 registers, where K is an integer value greater than two. Each processing module has at least one of the registers, each register for storing one data item. The control circuitry serially presents K data items for input to the systolic array circuit in synchronization with the clock signals. On the next clock cycle after the control circuitry presents to the systolic array circuit the last of the K data items, the data item of least value in the given subsequence is output.

36 Claims, 20 Drawing Sheets

OTHER PUBLICATIONS

Hall, Michael H, A Method of Comparing the Time Requirements of Sorting Methods, Communications of the ACM, May 1963, pp. 259-263, vol. 6 No. 5, ACM Publications.

Lee, De-Lei et al., A Multiway Merge Sorting Network, IEEE Transactions on Parallel and Distributing Systems, Feb. 1995, pp. 211-215, vol. 6 No. 2, IEEE Computer Society, Los Alamitos, CA, USA.

Lin, Yen-Chun, Optimal Sorting With a K-Sorter and K-Way Merging, Proceedings of the Proc. National Science Council ROC(A), Apr. 27, 1995, pp. 131-138, vol. 20 No. 1, National Science Council Republic of China, Taipei Taiwan, China.

Liu, G.S., Parallel Merger, Electronic Letters, Sep. 24, 1987, pp. 1069-1070, vol. 23 No. 20.

Satoh, Tetsuji et al., A Compact Multiway Merge Sorter using VLSI Linear-array Comparators, Foundations of Data Organization and Algorithms, 1989, pp. 223-227, vol. 367, Springer Berlin / Heidelberg.

Nakatani, Toshio et al., K-way Bitonic Sort, IEEE Transactions on Computers, Feb. 1989, pp. 283-288, vol. 38 No. 2, IEEE Computer Society, Los Alamitos, CA, USA.

Shimmler, Manfredm, Fast Sorting on the Instruction Systolic Array, Institut fur informatik und Praktische Mathematik, Jul. 1987, pp. 1-15.

Schmeck, Hartmut et al., Systolic s2-Way Merge Sort is Optimal, IEEE Transactions on Computers, Jul. 1989, vol. 38 No. 7, IEEE Computer Society, Los Alamitos, CA, USA.

Olariu, Stephan et al., How to Sort N Items Using a Sorting Network of Fixed I/O Size, IEE Transactions on Parallel and Distributed Systems, May 1999, pp. 487-499, vol. 10 No. 5, IEEE Computer Society, Los Alamitos, CA, USA.

Zhang, Yanjun et al., Design and Analysis of Systolic Sorting Architecture, Proceedings of the 7th IEEE Symposium on Parallel and Distributeed Processing, 1995, pp. 652-659, IEEE Computer Society Washington, DC, USA.

Thompson, Clark D., The VLSI Complexity of Sorting, IEEE Transactions on Computers, Dec. 1983, pp. 1171-1183, vol. c-32 No. 12, IEEE Computer Society, Los Alamitos, CA, USA.

Zhao, Lijun et al., An Efficient Mulitway Merging Algorithm, Science in China (Series E), Oct. 1998, pp. 543-551, vol. 41 No. 5.

International Search Report for PCT/US2010/024892 dated May 3, 2010; 7 pages.

* cited by examiner

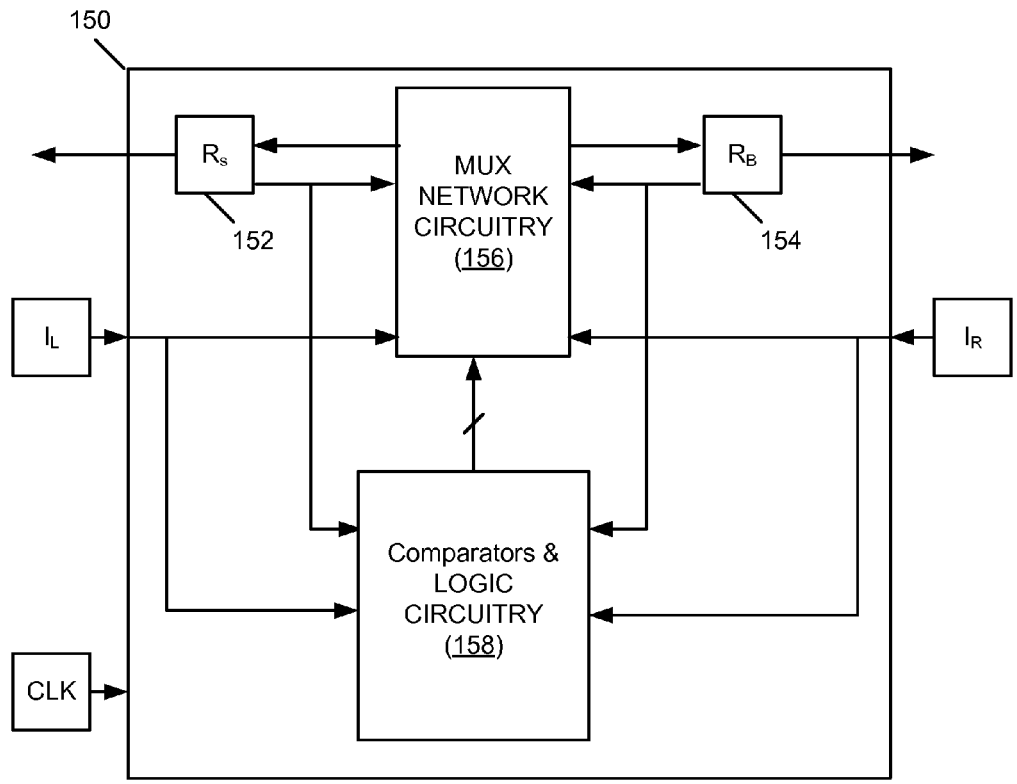
FIG. 10A
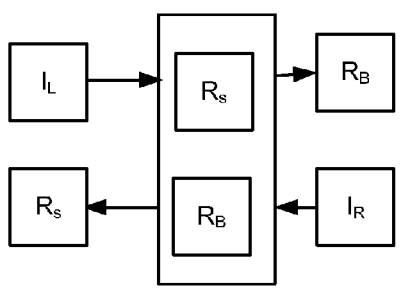
FIG. 10B
| CONDITION | New Rs | New $R_B$ |
|---|---|---|
| $I_L <= R_S <= R_B <= I_R$ | $R_S$ | $R_B$ |
| $R_S < I_L <= R_B <= I_R$ | $I_L$ | $R_B$ |
| $R_B < I_L , R_B <= I_R$ | $R_B$ | $I_L$ |
| $I_L <= R_S, R_S <= I_R < R_B$ | $R_S$ | $I_R$ |
| $I_L <= R_S, I_R < R_S$ | $I_R$ | $R_S$ |
| $R_S < I_L <= I_R < R_B$ | $I_L$ | $I_R$ |
| $R_S <= I_R < I_L , I_R < R_B$ | $I_R$ | $I_L$ |
FIG. 10C

ALTERNATE FILLING BEHAVIOR

| CONDITION | New $R_S$ | New $R_B$ |
|---|---|---|
| $R_S$ and $R_B$ are empty | $I_L$ | empty |
| $I_L <= R_S$, $R_B$ is empty or full | $I_L$ | $R_S$ |
| $I_L > R_S$, $R_B$ is empty or full | $R_S$ | $I_L$ |

*FIG. 14A*

ALTERNATE EMPTYING BEHAVIOR

| CONDITION | New $R_S$ | New $R_B$ |
|---|---|---|
| $R_B$ is empty | empty | empty |
| $I_R$ is empty | $R_B$ | empty |
| $R_B <= I_R$ | $R_B$ | $I_R$ |
| $R_B > I_R$ | $I_R$ | $R_B$ |

*FIG. 14B*

SYSTOLIC MERGE SORTER

GOVERNMENT RIGHTS IN THE INVENTION

This invention was made with Government Support under Contract No. FA8721-05C-0002. The Government has certain rights in this invention.

FIELD OF THE INVENTION

The invention relates generally to electronic sorting of data items or records. More specifically, the invention relates to hardware sorter systems and methods of K-way merge sorting of long sequences of data items or records.

BACKGROUND

Sorting long sequences of numbers has been an important task for many applications, such as searching, paring, uniqueness determination, frequency distribution algorithms, and sparse matrix algebra. Merge sort is one of the sorting algorithms that work well with very long lists or sequences of numbers. A merge sorter can be efficiently implemented with serial data storage technologies that store and read one data entry at a time, such as commercial memory integrated circuits or chips.

A conventional merge sorter can be used to sort long sequences of numbers by using a recursive divide-and-conquer approach. The merge sorter divides the sequence into two shorter subsequences of equal or near-equal length. These two subsequences are sorted independently. The sorted subsequences are then merged to produce the sorted result. The two subsequences can also be further divided into still shorter subsequences, then sorted and merged recursively using the same merge sort algorithm, to produce the sorted result. The process of dividing subsequences into still shorter subsequences can continue until each subsequence becomes of atomic length (i.e., a length equal to one number).

FIG. 1 shows an example of conventional merge sorting, in which 16 data items 10 are sorted in four steps 12, 14, 16, and 18. On the bottom row, the sequence to be sorted has been divided into 16 sequences having a length equal to one. Each step 12, 14, 16, and 18 merges pairs of sorted sequences (referred to as a 2-way merge sort). The fourth step 18 produces the final sorted result 20. The merge sort algorithm for conventional merge sorting can be implemented with a conventional general-purpose processor or digital signal processor working with random access memory. Where the length of the sequence to be sorted is n, this merge sort requires processor cycles of order $n \log_2 n$ and the number of memory locations of order 2n.

For many practical applications, the time to complete the sorting is important. When the sequence is relatively short, simple hardware accelerators can be designed to do the sorting quickly. For example, the entire tree-shaped recursive sorting structure for merge sorting shown in FIG. 1 can be embedded in a custom hardware accelerator, such as a Field Programmable Gate Array (FPGA) or an Application Specific Integrated Circuit (ASIC). Such hardware accelerators can provide the sorted result in order of $n+\log_2 n$ clock cycles with order of n−1 merge sort processing nodes, if maximum parallel processing architecture is used.

However, when an application requires sorting long sequences (i.e., having thousands, hundreds of thousands, millions of data items), the silicon area of a single chip is unlikely to be sufficiently large to implement the entire merge sort tree. And although multiple chips could be used to implement the entire merge sort tree, multiple chips generally increase the size, weight, power, and cost of the hardware. To minimize the size, weight, power, and cost of the hardware, it is often desirable to use one (or few) processor chips with commercial static or dynamic memory chips that provide high density at low cost. Notwithstanding, building a parallel processing solution around such memory devices is difficult because commercial memory chips are usually accessed serially, one byte or word of data at a time.

SUMMARY

In one aspect, the invention features a sorter system comprising a clock continuously generating a series of clock signals, a systolic array circuit, and control circuitry in communication with serial access memory storing data items of a sequence to be sorted and in communication with the systolic array circuit to supply thereto data items as input and to receive therefrom data items as output. The systolic array circuit includes at least one processing module and K−1 registers, where K is an integer value greater than two. Each processing module has at least one of the registers. Each register is for storing one data item. The control circuitry serially presents K data items for input to the systolic array circuit in synchronization with the clock signals. Wherein, on the next clock cycle after the control circuitry presents to the systolic array circuit the last of the K data items, the data item of least value in the given subsequence is outputted.

In another aspect, the invention features a computer-executed method of merge sorting a sequence having a large number of data items. The method comprises continuously generating a series of clock signals and serially presenting K data items for input to a systolic array circuit in synchronization with the clock signals. The systolic array circuit includes at least one processing module circuit and K−1 registers, where K is an integer value greater than two. Data items are conditionally exchanged between registers of the systolic array circuit during at least one clock cycle in which the K data items are serially presented to the systolic array circuit. The data item of least value of the K data items is outputted on the next clock cycle after the last of the K data items is presented to the systolic array circuit.

In still another aspect, the invention features systolic array circuitry comprising K−1 registers, where K is an integer value greater than two. Each register is for storing one data item. Identical processing module circuits are connected in a pipeline. Each processing module circuit is electrically connected to at least one neighboring processing module circuit for exchanging data items therewith. Each processing module circuit has at least one of the K−1 registers. A first one of the processing module circuits is first in position in the pipeline and is serially presented K input data items in synchronization with a series of clock signals. On the next clock cycle after the first processing module circuit in the pipeline is presented the last of K data items, a register of the first processing module circuit holds a data item of least value of the data items held by the K−1 registers in the systolic array circuitry.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 10A is a block diagram of an embodiment of a processing module for use in a systolic array and having two registers for holding two data items.

FIG. 10B is a simplified diagram of the embodiment of the processing module in FIG. 10A.

FIG. 10C is a table describing the functional behavior of the embodiment of the processing module in FIG. 10A during a merge sort process.

FIG. 14A is a table describing another embodiment of functional behavior of the embodiment of the processing module in FIG. 10A during the process of filling.

FIG. 14B is a table describing another embodiment of functional behavior for the embodiment of the processing module in FIG. 10A during the process of emptying.

DETAILED DESCRIPTION

Figure 1:
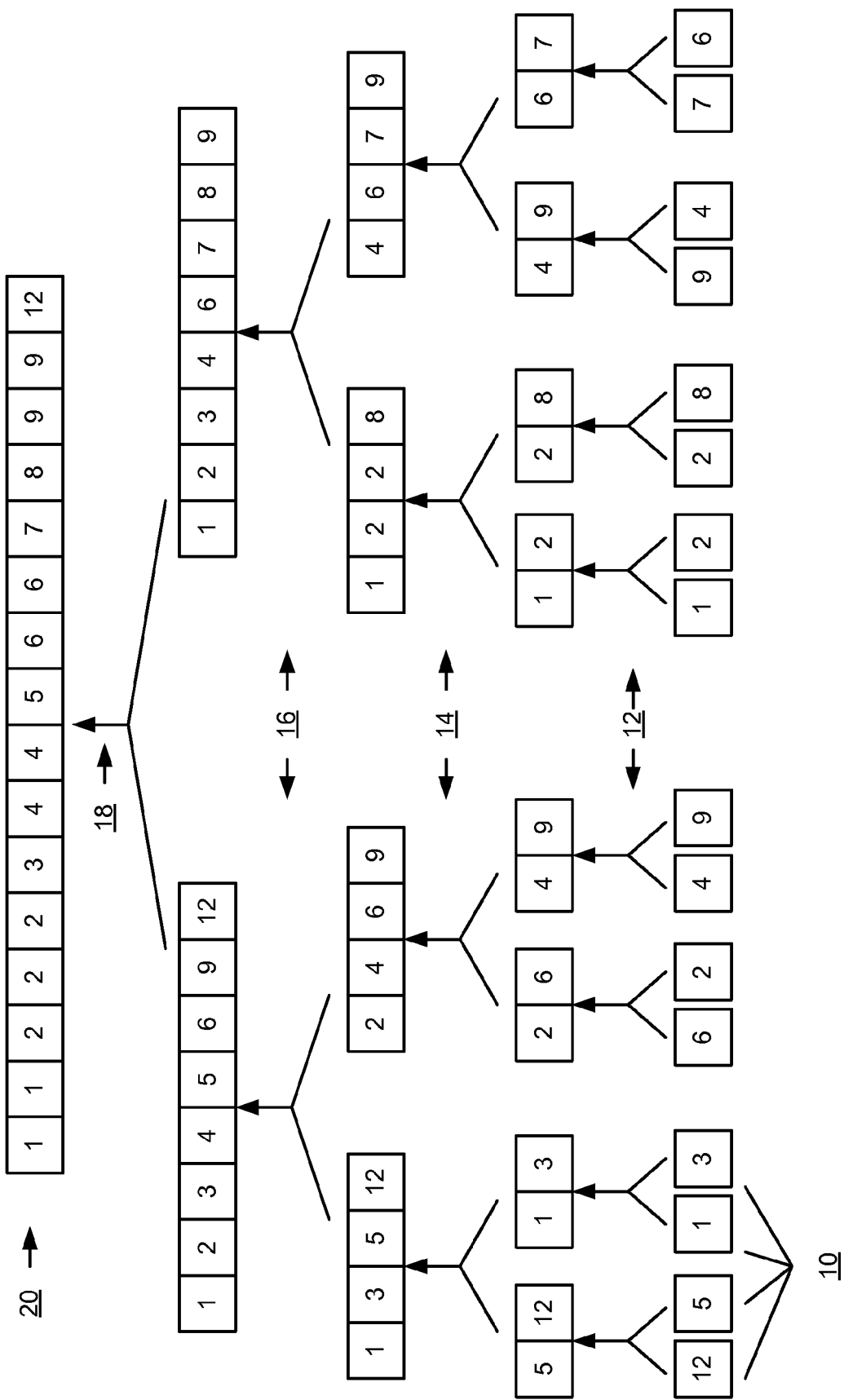
FIG. 1 is a diagram illustrating a conventional merge sort method.

Embodiments of K-way systolic merge-sort processors described herein sort long sequences of data items significantly faster than conventional 2-way merge sorters. In addition, the K-way systolic merge sorter processors described herein are particularly suited for interfacing serially accessed data storage technologies, such as commercial static and dynamic random access memory integrated circuits or chips, and random access memory cache operating in conjunction with disk drives. In general, serially accessed data storage stores and reads single data items or single groups of data items at a time.

A data item, as used herein, is an individually stored unit of data (i.e., a data structure) having a value by which that data item is ranked or sorted among other data items of the same kind. A data item may also be referred to herein as a data entry, a value, a number, a record, or an alphanumeric character. Each data item can be associated specifically with other information including, but not limited to, a data item identifier, a subsequence identifier, one or more flags, indices, and pointers to documents or records. When a given data item is being sorted, its value and associated information moves to and from various memory locations and array registers, as described further below. In general, an array register or simply register, as used herein, is a memory circuit capable of storing one or more bytes or words of data (e.g., data items).

In brief overview, a sorter system using a systolic merge sorter processor, as described herein, includes control circuitry and a systolic array. The control circuitry interfaces with the serially accessed memory and with the systolic array. The sequence being sorted is subdivided into a plurality of subsequences, each having K or fewer data items.

To sort each unsorted subsequence, the control circuitry serially presents the K data items of that subsequence as input to the systolic array in synchronization with clock signals. Within one clock cycle of when the control circuitry presents the systolic array with the last (i.e., Kth) data item of the subsequence, the data item of least value in the subsequence is output. The circuitry and sorting behavior of the systolic array ensures that the least value appears upon the next clock cycle after the control circuitry presents the last of the K data items to the systolic array, irrespective of the size of K.

Coming after the data item of least value, during subsequent clock cycles, the remaining data items of the subsequence emerge from the systolic array in sorted order. Accordingly, the systolic merger sorter converts each subsequence of unsorted data items into a sorted subsequence. After producing sorted subsequences from the unsorted subsequences, the systolic merge sorter processor iteratively K-way merge sorts sorted subsequences, in groups of K, until the final sorted sequence emerges.

The sorting achieved by the systolic merge sorter can be in non-decreasing order among the data items or in non-increasing order, depending on the order preferred for presenting the final sorted sequence. To simply the following description, the sorting order used to illustrate the K-way merge sort process is from least value to greatest (i.e., non-decreasing order).

Many sorting applications may be able to use the sorter systems described herein. For example, sorting engines of large databases and graph processors can implement such sorter systems. Sorting long sequences of numbers has been an important task for many applications such as searching, paring, uniqueness determination, frequency distribution algorithms, and sparse matrix algebra.

Figure 2:
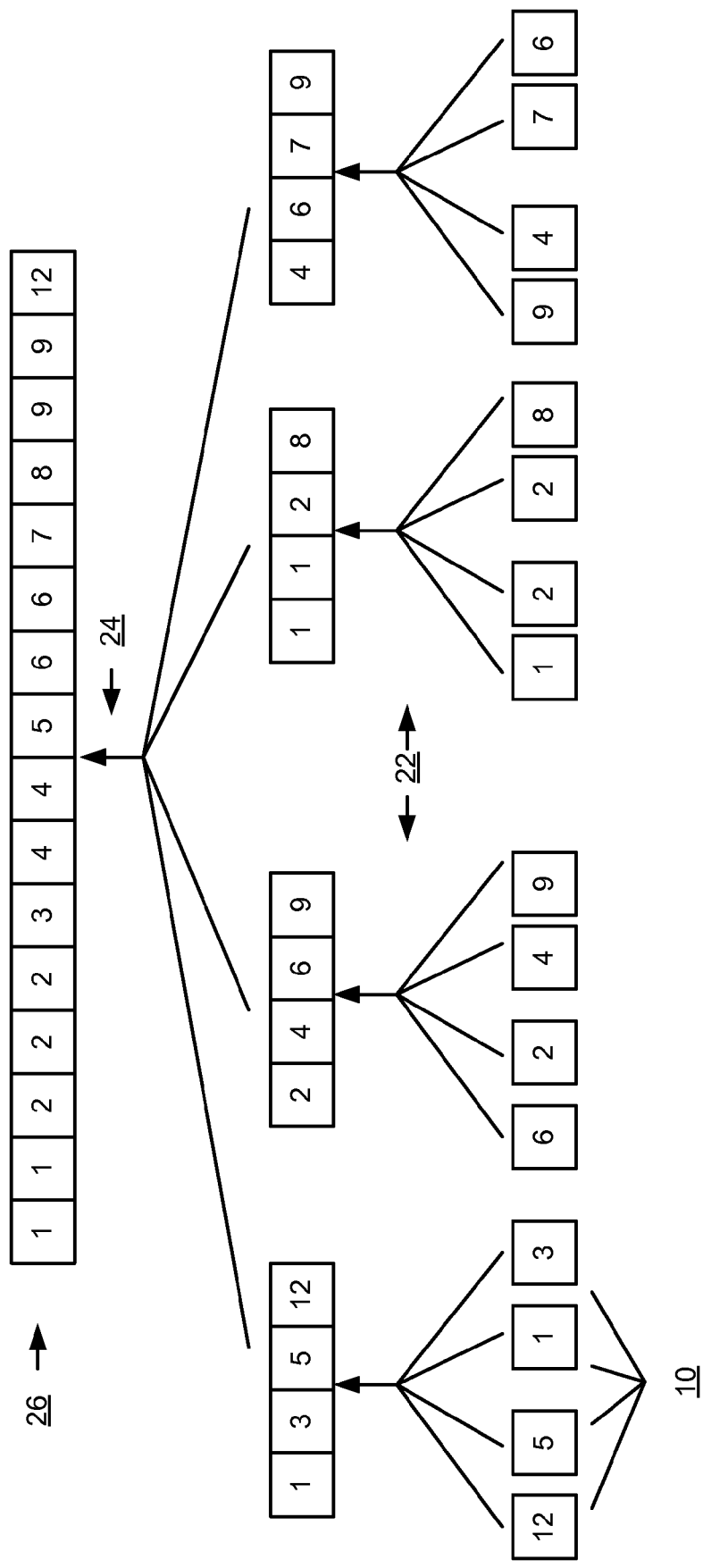
FIG. 2 is a diagram illustrating a K-way merge sort method performed on a small set of data items, for which K is equal to four.

FIG. 2 illustrates an example of a K-way merge sort process performed on a sequence comprised of a small set of data items. In general, when the value of K is large, K-way merge sorts complete more quickly than does a 2-way merge sort. Executing a K-way merge sort on a sequence of length n requires memory cycles of order $n \log_K n$ and memory locations of order 2n. Hence, a K-way merge-sort process is log K/log 2 times faster than a 2-way merge-sort process. For example, when K is equal to 1024, the K-way systolic merge sorters can sort a long sequence 10 times more quickly than a conventional 2-way merge sort. Although a conventional general-purpose processor and memory can perform a K-way merge sort, implementation of the process is inefficient because a general-purpose processor typically expends many clock cycles to sort the large lists involved in the merge sorting. Such delay slows down the K-way merge sort process, and the resulting throughput may not be an improvement over a 2-way merge sort.

In the simple example of FIG. 2, there are 16 data items (having the same values as the 16 data items shown in FIG. 1) and K is equal to four. The merge-sort process completes in two steps 22 and 24. On the bottom row, the sequence to be sorted is shown divided into 16 subsequences, each having a length equal to one. Each step 22 and 24 operates to merge four subsequences (a 4-way merge sort): during the first step 22, four groups of four subsequences, each comprised of one data item, merge sort to produce four sorted subsequences, each comprised of four data items; and at the second step 24, the four sorted subsequences produced at step 22 merge sort to produce the final sorted sequence 26.

Figure 3:
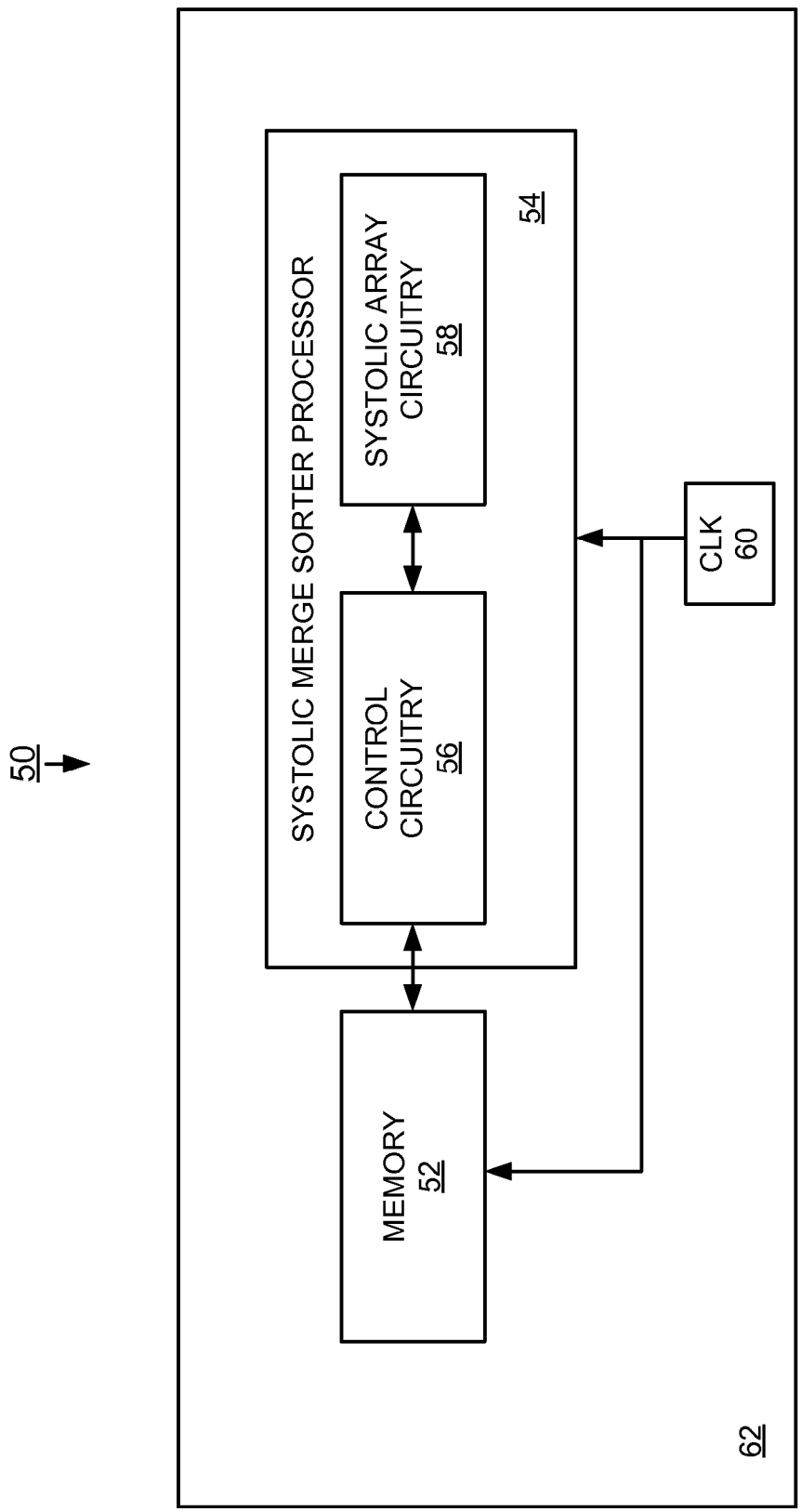
FIG. 3 is a block diagram of an embodiment of a sorter system having a systolic merger sorter with controller circuitry and systolic array circuitry.

FIG. 3 shows an embodiment of a sorter system 50 including memory 52 in communication with a systolic merge sorter processor 54 (hereafter, systolic merge sorter for short) for sorting long sequences of data items as described herein. The sorter system 50 can be embodied within a computing device 62, examples of which include, but are not limited to, a server computer, a personal computer (PC), a Macintosh computer, a workstation, a laptop computer, a network terminal, and an online gaming device such as Sony's PLAYSTATION™.

The memory 52 is serially accessed and stores the data items of the sequence to be sorted, intermediate results of the merge-sort, such as sorted subsequences, and the final sorted sequence. Examples of memory devices that can be used to implement the memory 52 include random access memories and static memories.

The systolic merger sorter 54 includes control circuitry (hereafter, controller 56) and systolic array circuitry (hereafter, systolic array 58). Although shown to be part of the systolic merger sorter 54, the controller 56 can be a separate component disposed between the memory 52 and the systolic merger sorter 54. The systolic merger sorter 54 can be implemented on a hardware accelerator device or integrated circuit chip, such as an FPGA or an ASIC.

The controller 56 provides an interface between the memory 52 and the systolic array 58, controlling the flow of data items to and from the memory 52 and to and from the systolic array 58, and controlling the progress of the merge-sorting process for a given sequence. The controller 56 can include buffers for queuing data items to be transferred from the memory 52 to the systolic array 58 and for queuing output data items being transferred from the systolic array 58 to the memory 52. A clock 60 provides a clock signal to the systolic merger sorter 54 and memory 52 for use in synchronizing the input and output data operations of the merge-sorting process. The systolic array 58 includes circuitry for performing the sorting operation, as described below.

In brief overview, the sorter system 50 sorts the data items of a given input sequence in two stages: (1) sorting of unsorted individual data items, in groups of K, to produce sorted subsequences, each having K data items; and (2) performing K-way merge sorts of sorted subsequences. After completion of the first stage, there may be numerous sorted subsequences. As for the second stage, there may be numerous rounds of K-way merge sorting in order to produce the final sorted sequence.

During of this merge-sorting process, the systolic merge sorter 54 may be deemed to be operating in one of three different modes: an input mode during which the controller 56 fills the systolic array 58 with data items, an output mode during which the systolic array 58 empties of data items, and a continuous operation mode. Sorting occurs as the systolic array is filling, emptying, and operating continuously. When operating in any one of these modes, the systolic array 58 is presented one data item and outputs one data item, either during each clock cycle or during alternating clock cycles, depending upon the particular embodiment of systolic merge sorter, as described below. In addition, during each clock cycle, the systolic array 58 performs sorting operations on the data items currently contained in the systolic array 58, including the data item currently being presented to the systolic array 58.

Figure 4:
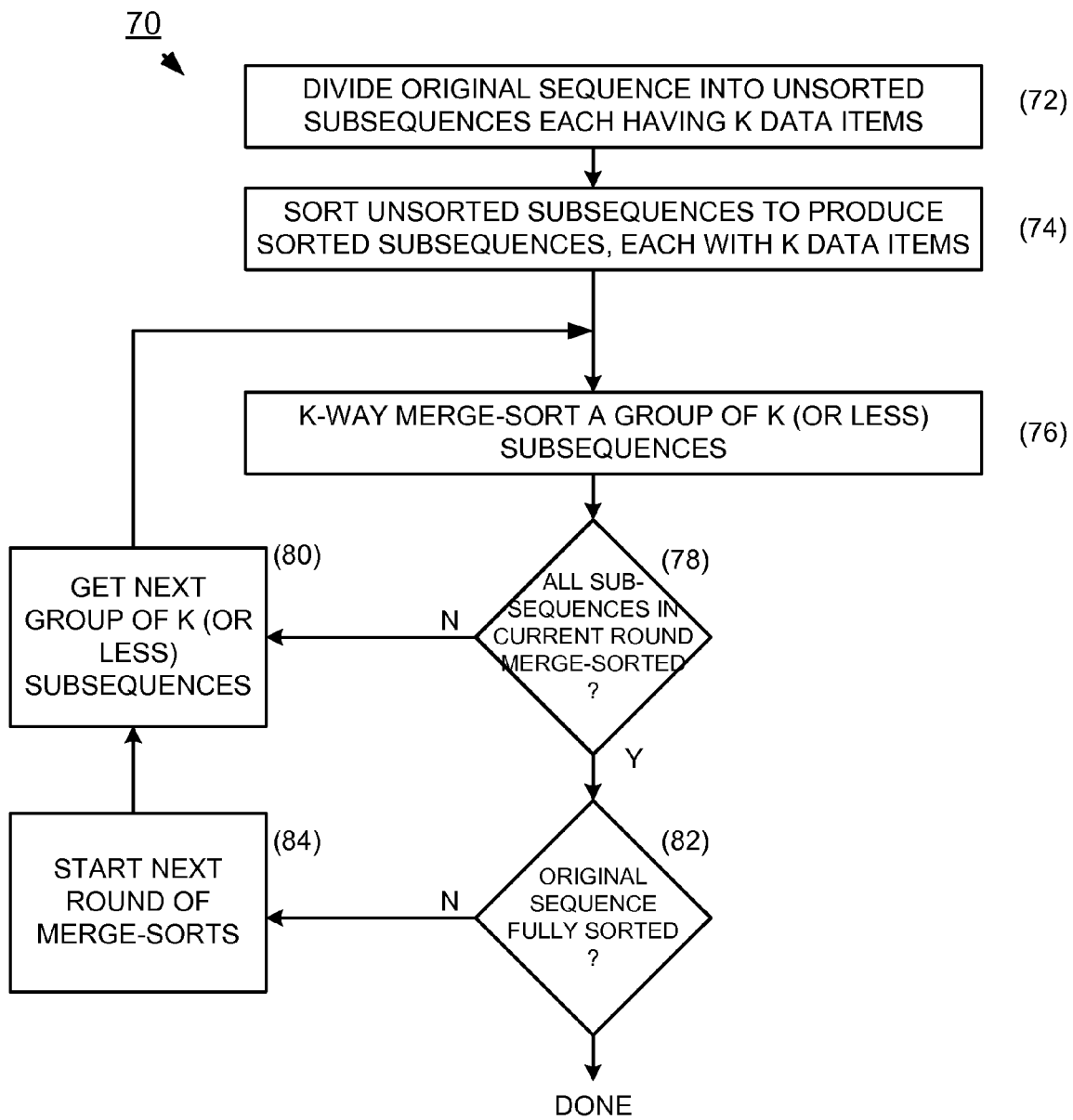
FIG. 4 is a flow diagram of an embodiment of a process for performing a K-way merge sort.

Reference is now made to FIG. 4 as an illustration of a process for performing a K-way merge sort of a given sequence. At step 72, the original sequence is divided into a plurality of unsorted subsequences. Each unsorted subsequence has K data items. If the number of data items in the original sequence does not divide evenly by K, one or more of the unsorted subsequences gets fewer than K data items. There may be hundreds, thousands, hundreds of thousands of such unsorted subsequences, depending upon the length of the original sequence and the size of K.

The systolic merge sorter 54 then operates in the input and output modes to sort (step 74) each of the unsorted subsequences. The systolic merge sorter 54 enters the input mode as part of the first stage when sorting K unsorted data items. When in the input mode, the systolic array 58 serially receives K data items. (The systolic array 58 is also outputting data items while in the input mode, but such data items are not valid, not being part of the sequence being sorted). Immediately after the last data item of the K data items of an unsorted subsequence has been presented to the systolic array 58, a valid data item is available as output (i.e., upon the next clock cycle) for writing back to memory 52. This data item is the least (or greatest, depending on the preferred order) of the K data items in the subsequence being sorted. Making available the least (or greatest) value upon the next clock cycle advantageously minimizes processing delay.

To complete the sorting of the K data items, the systolic merge sorter 54 enters the output mode (still first stage) to flush the systolic array 58 of the remaining data items of the subsequence. When in the output mode, one data item emerges from the systolic array 54 in sorted order during each clock cycle or during alternating clock cycles, depending upon the particular embodiment of systolic merge sorter. (The systolic array 58 also receives data items while in the output mode, but such data items are not valid and are being used for purposes of flushing the systolic array). The result of the input and output modes is a sorted subsequence of K data items. Certain address locations in the memory 52 can be dedicated to storing intermediate sort results, such as this and subsequent sorted subsequences.

To merge sort the sorted subsequences, the systolic merge sorter 54 operates in the continuous mode (second stage) and selects (step 76) a first group of K sorted subsequences stored in the intermediate results region of memory 52. In general, groups of K sorted subsequences are merge-sorted into a single sorted subsequence of size K*K. A group can have fewer than K sorted subsequences if the number of sorted subsequences is not a multiple of K.

When in the continuous mode, the controller 56 presents to the systolic array 58 a first data item from each of the K sorted subsequences. Each of such data items has the least value in its respective subsequence. After the last data item of the K data items has been presented to the systolic array 58, a valid data item, the one of least value, is immediately available as output for storing in memory 52 (in an address location reserved for storing this type of intermediate result).

During the next input clock cycle, the controller 56 acquires the next input data item from the sorted subsequence to which the output data item belonged, and submits this next data item to the systolic array 58. Throughout the merge-sorting of the K sorted subsequences, the controller 56 keeps track of the particular subsequence to which each data item belongs. Such tracking can be accomplished, for example, by storing the address of the associated subsequence along with each data item.

When all data items have been read from a particular subsequence (the subsequence becomes empty) the controller 56 stops reading data items from that subsequence for purposes of acquiring input for the systolic array 58. When the systolic array 58 outputs a data item that originally came from a subsequence that is now empty, the controller 56 does not submit any data item to the systolic array 58 during the next clock cycle, and the systolic array 58 outputs the least value among its current data items.

The process of outputting a data item from the systolic array 58, storing that data item into memory 52, and reading the next data item of least value from the particular subsequence from which the last outputted data item came repeats (step 76) until all K sorted subsequences of a group are merge-sorted and the resulting sorted subsequence stored in the intermediate result area of memory. The resulting sorted subsequence is $K^2$ in length.

If, at step 78, additional sorted subsequences of length K remain to be merge-sorted, the controller 56 selects (step 80) the next group of K sorted subsequences and K-way merge sorts (step 76) that group. After all groups of K sorted subsequences of length K are merge-sorted, the systolic merge-sorter 54 proceeds to merge-sort all groups of K sorted subsequences of the length $K^2$. Each resulting subsequence from this round of merge sorting is of length $K^3$. Until a single sorted final sequence emerges (step 82), the systolic merge sorter 54 repeats the process by starting another new round of K-way merge sorting of the most recently generated sorted subsequences.

Figure 5:
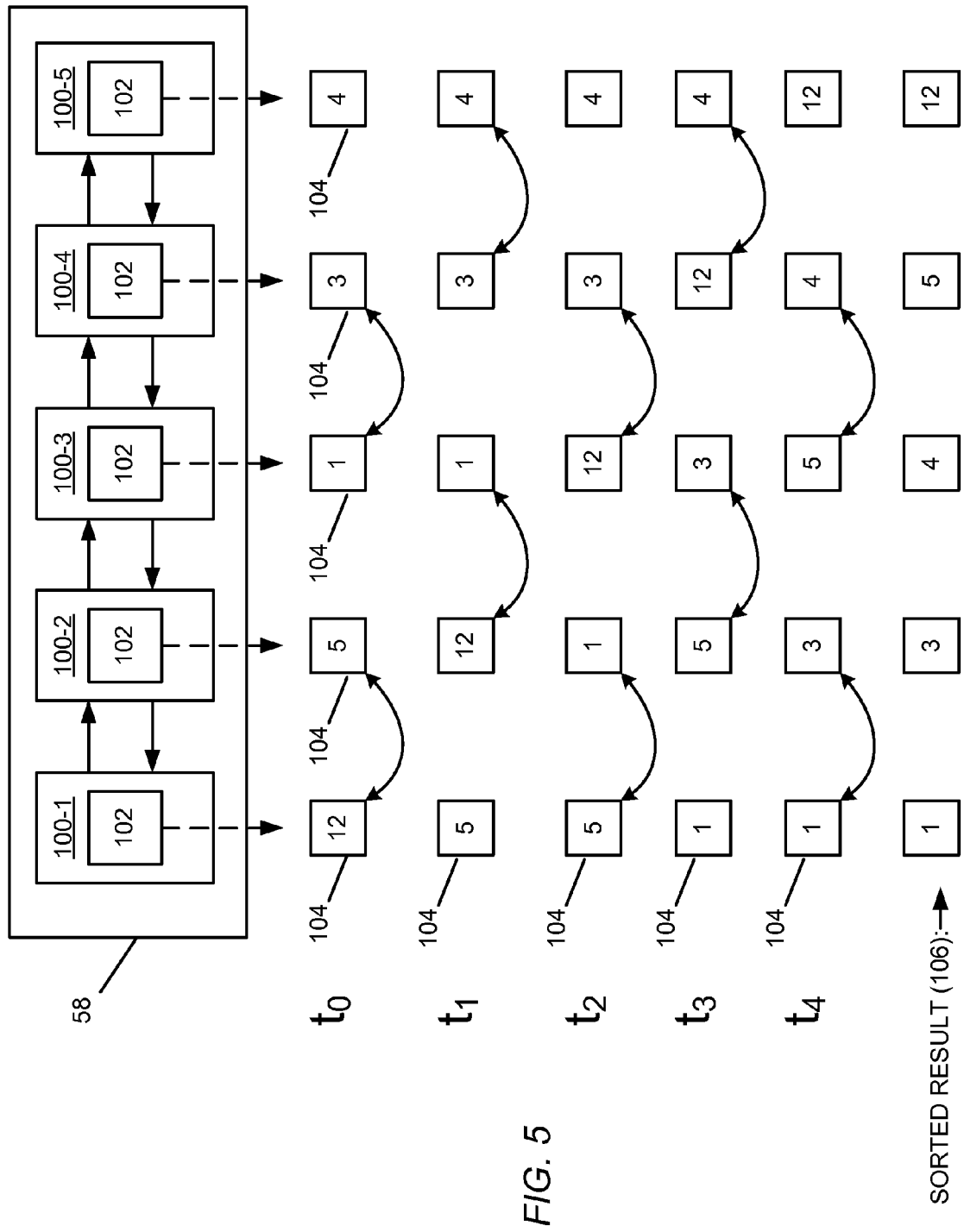
FIG. 5 is a block diagram of an embodiment of a systolic array sorting, as an illustrative example, five data items.

FIG. 5 shows an embodiment of a systolic array 58, including five identical processing (computational) modules 100-1, 100-2, 100-3, 100-4, and 100-5 (generally, 100) arranged in pipeline fashion. Each processing module 100 is in bidirectional data communication with one or two neighboring processing modules (processing modules 100-1, 100-5 at the opposite ends of the pipeline have only one neighbor).

An advantage of the systolic architecture is its use of a highly regular array of identical processing modules with nearest neighbor communications. Such architecture is easily implemented in integrated circuits (ICs) or in FGPAs. Design optimization focused on such processing modules can lead to small chip die size, high clock speed, and low power consumption. Systolic arrays of any dimension can be fabrication by replicating a select number of these processing modules 100.

Each processing module 100 has a register 102 for storing a data item and logic circuitry (not shown) for performing comparisons and conditional value swapping, as described below. This particular embodiment of the systolic array 58 is shown sorting a set of five data items 104. The values of the data items 104 stored in the registers 102 of the processing modules 100 appear directly below the systolic array 58, illustrating the changing of such values over the course of the five clock cycles (represented by $t_0$, $t_1$, $t_2$, $t_3$, and $t_4$). The dashed arrows signify the correspondence between a given register 102 and its current value. For purposes of focusing on the sorting behavior of the systolic array 58, the inputting and outputting of data items during each clock cycle are not shown or described.

In general, the systolic array 58 sorts the data items by performing conditional swaps of values between neighboring pairs of processing modules. The particular pairs of neighbors that swap values alternate every clock cycle. For example, during the first clock cycle and every other subsequent clock cycle, the neighboring pairs of processing modules that conditionally swap values comprise an odd-numbered processing module, counting from the left of the pipeline (here, for example, processing modules 100-1 and 100-3), and the neighboring processing module on its immediate right. During the second clock cycle and every other subsequent clock cycle, the neighboring pairs of processing modules that conditionally swap values comprise an even-numbered processing module (here, for example, processing modules 100-2 and 100-4) and the neighboring processing module on its immediate right. When sorting in non-decreasing order, value swapping occurs between neighbors if the value held by the left neighbor is greater than the value held by the right neighbor.

As an illustrative example of this sorting behavior, consider that at time t0 the values of the data items 104 are as shown: the register of processing module 100-1 holds a value of 12; that of processing module 100-2, a value of 5; that of processing module 100-3, a value of 1; that of processing module 100-4, a value of 3; and that of processing module 100-5, a value of 4. During the clock cycle of time to, processing modules 100-1 and 100-2 compare and swap their data item values if the value of the data item in processing module 100-1 is greater than the value of the data item in processing module 100-2. (the sorting being from least value to greatest). Similarly, processing modules 100-3 and 100-4 compare and conditionally swap their data item values during the clock cycle of time $t_0$. Time $t_1$ shows that the processing modules 100-1 and 100-2 swapped values at time $t_0$, whereas processing modules 100-3 and 100-4 did not.

Such value comparisons between processing modules 100-1 and 100-2 and between processing modules 100-3 and 100-4 occur every other clock cycle, at times $t_0$, $t_2$, $t_4$, etc. Value comparisons between processing modules 100-2 and 100-3 and between processing modules 100-4 and 100-5 occur during alternate clock cycles from those comparisons between processing modules 100-1 and 100-2 and between processing modules 100-3 and 100-4. For instance, value comparisons (and value swapping, if appropriate) between processing modules 100-2 and 100-3 and between processing modules 100-4 and 100-5 occur every other clock cycle, at times $t_1$, $t_3$, etc. The result of the value comparisons and value swapping is that lower values move towards the left of the pipeline and greater values move towards the right of the pipeline. The value comparisons and value swapping that occur at time $t_4$ (i.e., during the fifth clock cycle) complete the sorting of the five data items 104. In the sorted result 106, the values are in non-decreasing order, from left to right, across the processing modules 100.

In general, to sort the array and have the result available in non-decreasing order takes K clock cycles, where K is the number of values being sorted. For instance, in FIG. 5, the sorting of five data items completes and the sorted result is available in five clock cycles. If K clock cycles are needed to shift data items into the systolic array 58 and K clock cycles are needed to shift data items out of the systolic array, the input/output (I/O) of the data items requires 2*K clock cycles.

Alternatively, when sorting multiple subsequences each having K data items, shifting data in and out of the systolic array 58 can occur simultaneously (within the same clock cycle). For example, during each clock cycle, the controller 56 can supply a new data item to the systolic array 58 while the systolic array 58 shifts out a sorted data item to the controller 56. Accordingly, the I/O of the data items for each subsequence requires K clock cycles, not 2*K. When sorting a large number of subsequences, it takes about 2*K clock cycles to sort K data items including I/O.

Figure 6:
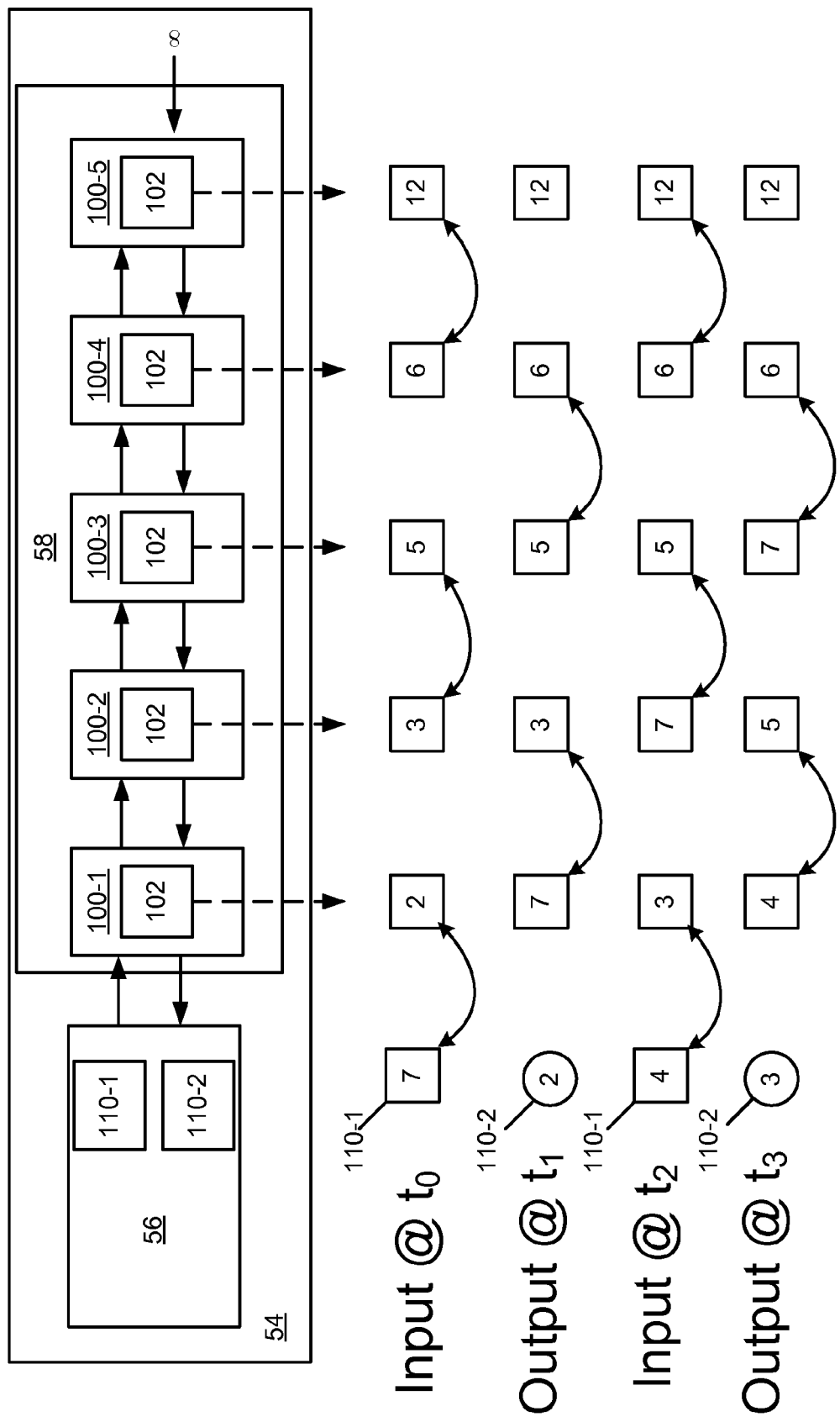
FIG. 6 is a block diagram of an embodiment of a systolic merge sorter operating in continuous mode for a 6-way K-way sort.

FIG. 6 shows an embodiment of the systolic merge sorter 54 including an embodiment of the controller 56 of FIG. 3 and the systolic array 58 of processing modules 100 of FIG. 5. The leftmost processing module 100-1 of the systolic array 58 is in bidirectional communication with the controller 56. The controller 56 includes an input register 110-1 and an output register 110-2. The input register 110-1 is for holding data items that are to be presented as input to the leftmost processing module 100-1 of the systolic array 58 and the output register 110-2 is for receiving data items as output.

This particular embodiment demonstrates sorting behavior when the systolic merge sorter 54 is operating in the continuous mode (second stage) of a K-way merge sort, wherein K is equal to six (i.e., corresponding to the combined total of six data items being held by the controller 56 (one) and the five processing modules 100 (one each)). As described above, during a first round of sorting in the continuous mode, the systolic merge sorter 54 performs K-way merge sorting of K sorted subsequences. Initially, the controller 56 serially presents to the systolic array 58 with one data item (the one of least value) from each of the K sorted subsequences; the controller 56 holding the Kth or last data item of the K data items.

The values stored in the registers 102 of the processing modules 100 for a given clock cycle appear directly below the systolic array 58 (pointed to by dashed arrows). On any given clock cycle, the controller 56 passes a data item as input to or receives a data item as output from the systolic array 58. In this example, the controller 56 presents a data item as input at times $t_0$, $t_2$, etc., and receives a data item as output at times $t_1$, $t_3$, etc.

The systolic array 58 performs conditional swaps between neighboring pairs of processing modules 100 similar to that described in FIG. 5. In this example, during the first clock cycle and every other subsequent clock cycle, the neighboring pairs that conditionally swap values comprise an even-numbered processing module (including the controller 56) and its immediate neighbor on the right; and during the second clock cycle and every other subsequent clock cycle, the neighboring pairs that conditionally swap values comprise an odd-numbered processing module and its immediate neighbor the right.

Consider for example that at time $t_0$ the values of the data items within the processing modules are as shown: the register of processing module 100-1 holds a value of 2; that of processing module 100-2, a value of 3; that of processing module 100-3, a value of 5; that of processing module 100-4, a value of 6; and that of processing module 100-5, a value of 12. These initial values appear in sorted order from left to right across the processing modules because of the sorting behavior of the systolic array 58 during the initial loading of the least value from each of K subsequences.

During the clock cycle of time $t_0$, the data item value held in the input register 110-1 of the controller 56 is compared and swapped with, if greater than, the value of the data item in the register 102 of the processing module 100-1. In addition, the processing modules 100-2 and 100-3 compare and conditionally swap their data item values, while processing modules 100-4 and 100-5 compare and conditionally swap their data item values.

The contents of the processing modules 100 at time $t_1$ show that during time $t_0$ the input register 110-1 and processing module 100-1 swap values, whereas processing modules 100-2 and 100-3 and processing modules 100-4 and 100-5 do not. The swapping of values between the input register 110-1 and the processing module 100-1 produces an output that passes to the output register 110-2 (here, e.g., that data value is equal to two). As described further below, because of the sorting behavior of the systolic array 58, this output value will be least among the values presently in the systolic array 58, inclusive of the value being passed from the controller 56 as input at time $t_0$. For instance, if instead of having the value of seven, the value being passed from the controller 56 as input is equal to one, then the value that passes to the output register 110-2 is one (which is less than the value of two held in the leftmost processing module 100-1).

Similar to the sorting behavior of the systolic array 58 shown in FIG. 5, the result of the value comparisons and value swapping during each clock cycle is to move greater values towards the right of the pipeline while moving lesser values towards the left and, ultimately, out of the pipeline and into the output register 110-2 of the controller 56. In this example, an incoming data item requires two clock cycles on average to reach its sorted position within the systolic array 58, which depends on the other values currently in the processing modules. Therefore, this systolic array averages two clock cycles per data item to K-way merge sort.

When selecting the next data item to be supplied as input to the systolic array 58, the controller 56 identifies the sorted subsequence from which the most recent output data item belonged. As described above, the address of the sorted subsequence from which that data item came can be stored along with the data item. When the selected sorted subsequence is empty, the controller 56 provides a marked data item as input to the systolic array 58. This marked data item is a first of two types of marked data items described herein (the second type being described below). Examples of markers include, but are not limited to, a flag (e.g., a bit) that accompanies the data item and signifies an empty or invalid data item, a special symbol or character, and an exceedingly large value, for example, infinity ($\infty$). In general, the systolic array 58 treats the marked data item as the highest possible value and operates to shift the marked data item as far right in the systolic array as possible. After it has received a marked data item as input, the systolic array 58 continues to provide the data item of least value as output to the controller 56 in the next clock cycle. In addition, during the sorting process, the rightmost processing module 100-3 receives an "infinity" input from the right to indicate that this rightmost processing module does not swap on its right.

Figure 7:
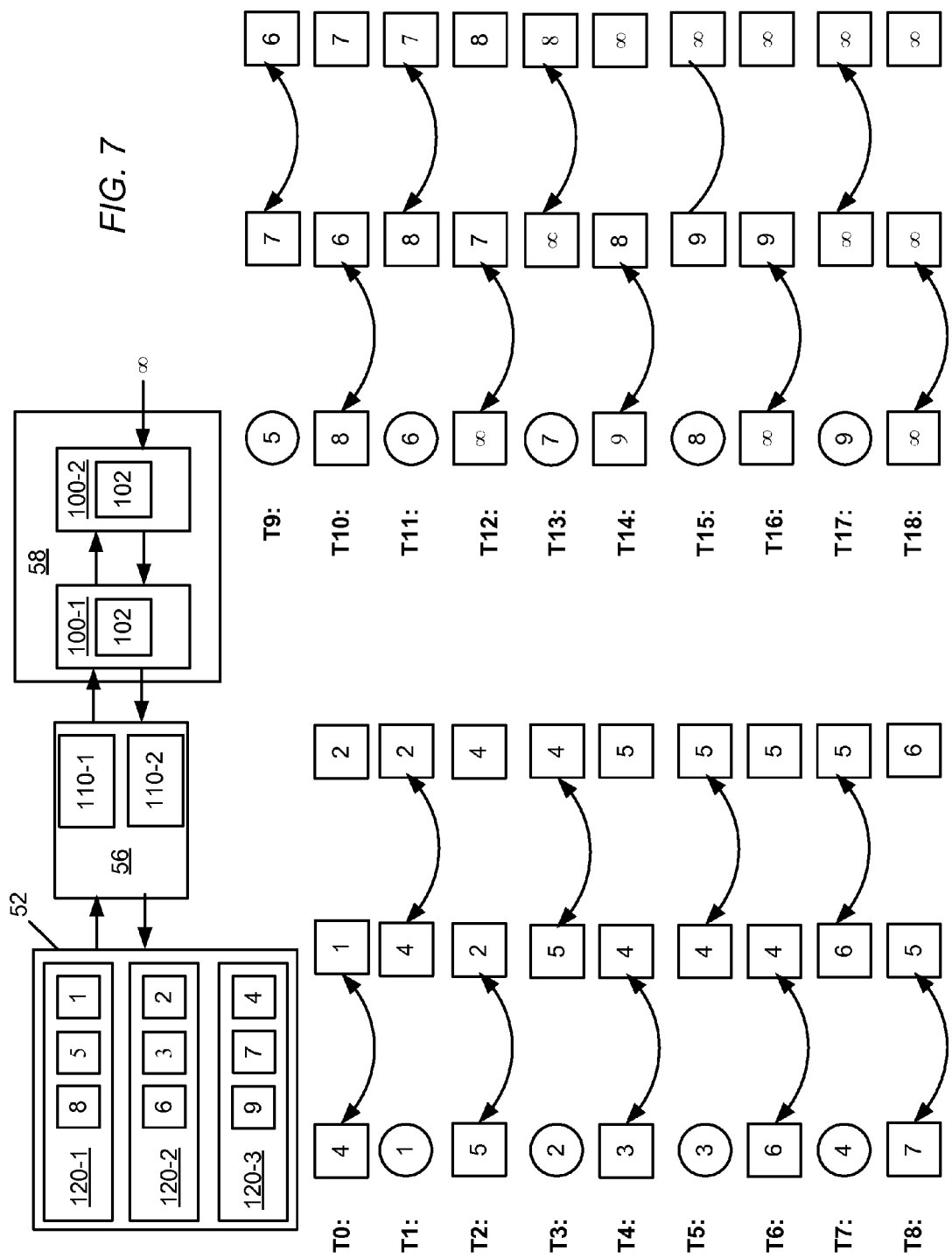
FIG. 7 is a block diagram of an embodiment of a sorter system with a systolic merge sorter operating in continuous mode and performing a 3-way K-way sort.

FIG. 7 shows an embodiment of a 3-way systolic merge sorter 54 having the controller 56 in communication with the systolic array 58. In this embodiment, the systolic array 58 has two processing modules 100-1, 100-2, with the leftmost processing module 100-1 in bidirectional communication with the controller 56. The controller 56 includes an input register 110-1 for holding data items that are to be passed as input to the leftmost processing module 100-1 and an output register 110-2 for receiving data items as output.

FIG. 7 also illustrates, by example, the systolic merge sorter 54 operating in continuous mode to perform a merge sort of three sorted subsequences 120-1, 120-2, 120-3 (generally, 120) stored in an intermediate result region of the memory 52. Each subsequence 120 has three data items, sorted in non-decreasing order (from right to left). The data items in the subsequences are as they exist before the start of the 3-way merge sort.

Time $t_0$ shows the contents of the controller 56 and the processing modules 100-1, 100-2 after the least value from each subsequence 120 has been acquired by the controller 56 and presented to the systolic array. The input register 110-1 of the controller 56 has a data item value equal to four, while the registers 102 of the processing modules 100-1, 100-2 hold values equal to 1 and 2, respectively. During time $t_0$, the controller 56 and processing module 100-1 compare and swap values (because the controller holds the greater value). At time $t_1$, the output register 110-2 receives the data item of least value (equal to 1) for storing in memory 52.

Because the output data item came from the subsequence 120-1, at time $t_2$ the controller 56 obtains the next data item (equal to 5) to be presented to the systolic array from this subsequence 120-1. This process of data item selection occurs at every input clock cycle ($t_4$, $t_6$, $t_8$, etc.). Of particular note, at time $t_4$, the controller 56 presents a data item of lesser value than the data item held by the processing module 100-1. Consequently, no swap occurs between the controller 56 and processing module 100-1, and at time T5, the output register 110-2 receives the data item of lesser value (equal to 3). Of additional note, at time $T_{12}$, the subsequence 120-2 is empty when the controller 56 accesses it to obtain an input data item. Because the subsequence 120-2 is empty, the controller 56 presents a marked data item of the first type (i.e., of greatest value), which, in a subsequent clock cycle, propagates to the right end of the pipeline as a result of value swapping between the neighboring processing modules 100-1, 100-2.

Figure 8:
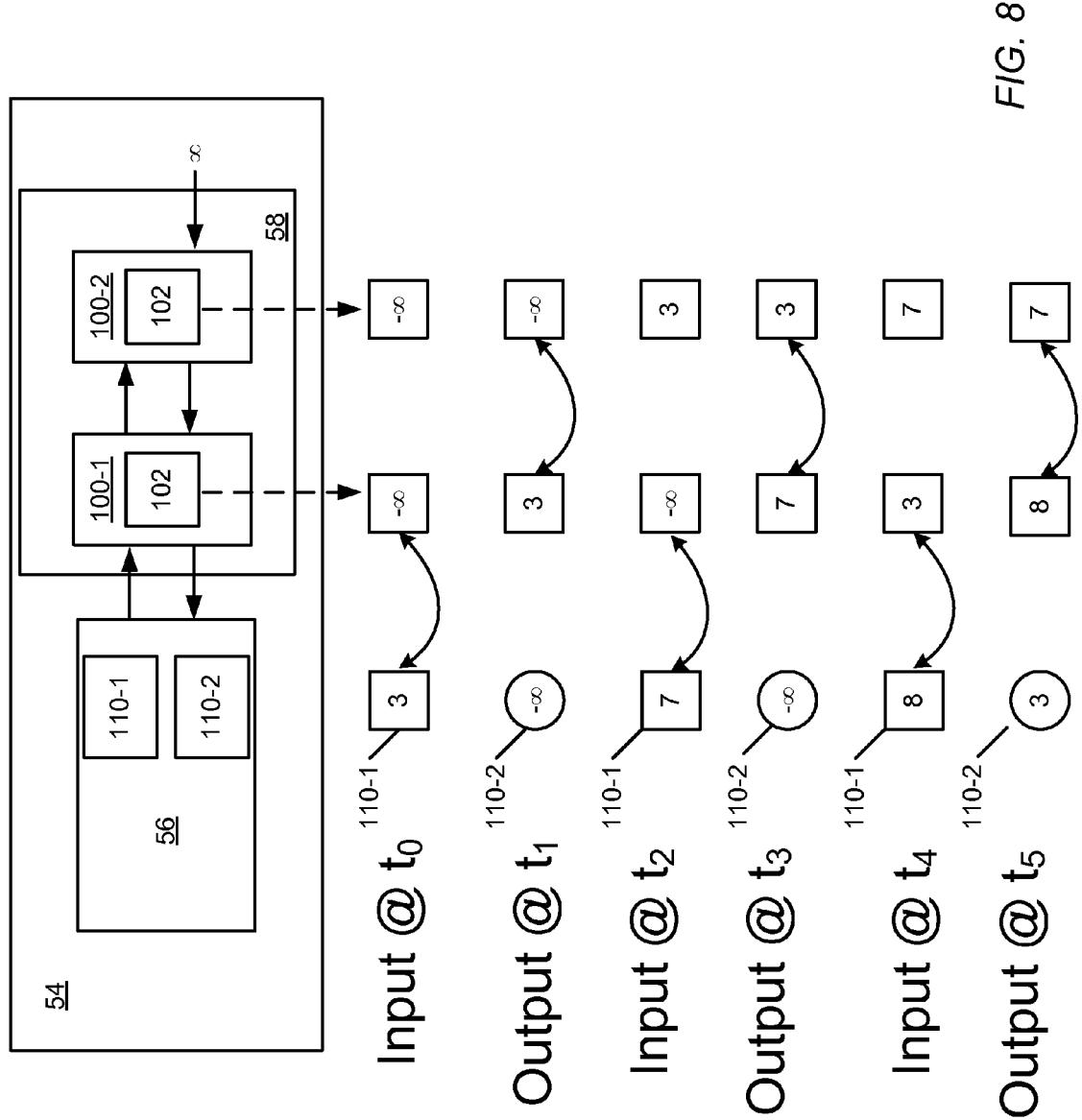
FIG. 8 is a block diagram of the embodiment of systolic merge sorter of FIG. 7, illustrating a process of filling the systolic array with data items.

FIG. 8 shows an embodiment of the systolic merge sorter 54 and a first stage process of filling the two processing modules 100-1, 100-2 of the systolic array 58 with data items. The values stored in the registers 102 of the processing modules 100 for a given clock cycle appear directly below the systolic array 58 (denoted by the dashed arrows). On any given clock cycle, the controller 56 presents a data item as input to or receives a data item as output from the systolic array 58. In this example, the controller 56 passes a data item as input at times $t_0$, $t_2$, etc., and receives a data item as output at times $t_1$, $t_3$, etc.

Initially, the processing modules 100-1, 100-2 are filled with a second type of marked data item. The second type of marked data items represents an exceedingly low value (e.g., negative infinity); the processing modules 100 treat such marked data items to be of least possible value, lower than all valid data items (i.e., data items in the subsequence to be merge-sorted). Accordingly, all comparisons between this second type of marked data item and a valid data item result in a value swap, with the marked data item shifting to the right and the valid data item shifting left (for a non-decreasing sort).

Referring to FIG. 8, consider, for example, that at time to the controller 56 presents a data item with a value equal to 3; during the clock cycle of time $t_0$, the controller 56 and processing module 100-1 compare and conditionally swap their data item values. During initial loading, the swap occurs because the processing module 100-1 currently contains a marked data item signifying the lowest of all possible data item values.

At time $t_1$ the controller 56 receives the marked data item as output from the processing module 100-1 as a result of the value swap, while the processing module 100-1 and the processing module 100-2 compare their data items to determine whether to swap values. Again, during initial loading, this swap occurs because the processing module 100-2 currently contains a marked data item, which is treated as being less in value than the current value held by the processing module 100-1.

Subsequently, at time $t_2$, the controller 56 presents a second data item, in this example, with a value equal to 7. As is evident, the first input data item (value equal to 3) has migrated as far to the right as possible in the systolic array 58 of this size because the processing modules 100-1, 100-2 have swapped values as a result of their comparison during the previous clock cycle ($t_1$). In the current clock cycle ($t_2$), the controller 56 and processing module 100-1 compare and conditionally swap their current data item values. Because the processing module 100-1 now contains a marked data item as a result of the value swap with the processing module 100-2, a value swap with the controller 56 occurs.

At time $t_3$, the controller 56 receives the second marked data item as output from processing module 100-1 as a result of the value swap, while the processing module 100-1 and the processing module 100-2 compare and conditionally swap their data items. In this example, the processing modules 100-1, 100-2 swap values (7 being greater than 3).

At time $t_4$, the controller 56 supplies a third data item, in this example, with a value equal to 8. During the $t_3$ clock cycle, the processing modules 100-1, 100-2 swapped values as a result of their comparison. Accordingly, the first input data item (value equal to 3) has moved back to the processing module 100-1. Also during this clock cycle ($t_4$), the controller 56 and processing module 100-1 compare and conditionally swap their current data item values. Because the value of the new input data item is greater than that of the current value in processing module 100-1, the swap occurs.

After the presenting of the Kth data item (here, K=3) to the systolic array, the systolic array 58 starts outputting data items in sorted order upon the next clock cycle ($t_5$). As is evident from the contents of the processing modules 100 during clock cycle $t_5$, the data items may not be fully sorted across the processing modules 100 when the first output data item emerges. Notwithstanding, the process of emptying the systolic array of data items completes the sorting process and ensures that data items emerge in non-decreasing order.

Figure 9:
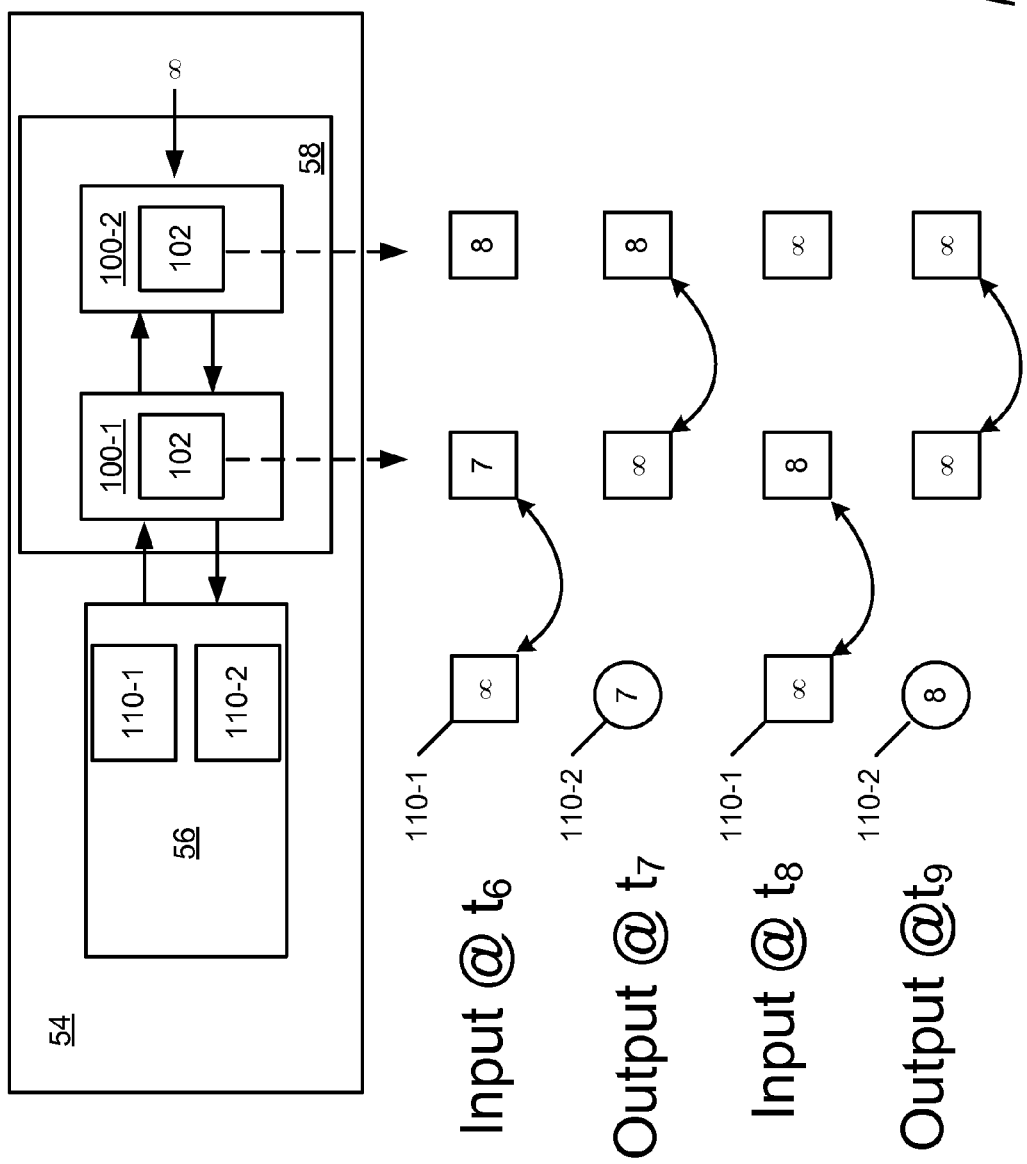
FIG. 9 is a block diagram of the embodiment of systolic merge sorter of FIG. 7, illustrating a process of emptying the systolic array of data items.

FIG. 9 shows the first stage process of emptying the two processing modules 100-1, 100-2 of data items, which follows the process of filling that was described in connection with FIG. 8. The process of emptying starts at clock cycle $t_6$ when the controller 56 presents a marked data item of the first type (of highest possible value) to the systolic array 58. The controller 56 and the processing module 100-1 compare and conditionally swap their current data item values. Because the value of the marked data item is greater than that of the value in processing module 100-1, the swap occurs.

At time $t_7$, the controller 56 receives the data item of least value in the systolic array as output from the processing module 100-1, while processing module 100-1 and processing module 100-2 compare and conditionally swap their data items. In this example, the processing modules 100-1, 100-2 swap values (∞ being greater than 8). Accordingly, the first marked data item migrates to the right end of the pipeline, while the data item of least value in the systolic array 58 shifts left by one processing module.

At time $t_8$, the controller 56 supplies a second marked data item of the first type to the systolic array 58. Based on a comparison of their current data items, the controller 56 and the processing module 100-1 swap values again. At time $t_9$, the last sorted data item emerges as output from the processing module 100-1, while processing module 100-1 and processing module 100-2 compare, but do not swap their data items (both hold marked data items of the same highest possible value).

The systolic arrays 58 described in FIGS. 5-9 take two clock cycles per data item for each round of a K-way merge sort. This rate of I/O corresponds with the performance of many types of serially accessed memory; usually one clock cycle is needed to read from the memory 52 to acquire a data item for input to the systolic array 58, and one clock cycle is needed to write an output data item into the memory 52.

For systems with multiple memory banks, the controller 56 can read a data item from one memory bank, while writing an output data item into another memory bank within a single clock cycle. Alternatively, some fast memory systems can accommodate memory read and write within a single clock cycle. Such memory systems can speed up the merge sorting process. To take advantage of such memory systems, other embodiments of systolic merge sorters can receive an input data item and produce an output data item within a single clock cycle.

FIG. 10A shows one such embodiment of a processing module 150 that enables a systolic merge sorter to receive an input data item and produce an output data item within a single clock cycle. FIG. 10B shows a simplified representation of this processing module 150. In contrast to the processing modules 100 of the systolic array 58 shown in FIG. 5, systolic arrays that employ this embodiment of processing module 150 hold two values instead of one, have more circuitry in each processing module, and perform continuous K-way merge sorting twice as fast by receiving one input and providing one output for every clock cycle instead of alternating between input and output every clock cycle.

The processing module 150 includes a first register ($R_S$) 152 and a second register ($R_B$) 154, each register in bidirectional communication with a multiplexer network circuit 156. The register $R_B$ holds the greater of the two values held in the processing module 150, while the register $R_S$ holds the lesser of the two values in the processing module 150. (The values in the registers 152, 154 can occasionally be the same). Each register 152, 154 is also in communication with comparator and logic circuitry 158 to pass its value stored therein.

During each clock cycle, the processing module 150 passes the value in register $R_B$ to its immediate neighbor on the right, if any, and the value in the register $R_S$ to its immediate neighbor on the its left, if any. Also in the same clock cycle, the processing module 150 receives the value held in the register $R_B$ of the immediate neighbor on its left (represented as $I_L$), or from the controller 56 in the case of the first processing module in the pipeline. Arriving also is the value held in the register $R_S$ of its immediate right neighbor (represented as $I_R$), or if, the processing module has no right neighbor, a marked data item of the first type. The multiplexer network circuit 156 and the comparator and logic circuitry 158 of the processing module 150 receive the values $I_L$ and $I_R$.

In each clock cycle, the circuitry of the comparator and logic circuitry 158 determines the ranking among the incoming values $I_L$ and $I_R$ and the current values in $R_S$ and $R_B$. The comparator and logic circuitry 158 compares the greater value in the processing module 150 (i.e., $R_B$) with the lesser value in the processing module on its immediate right (i.e., $I_R$) and the lesser value in the processing module 150 (i.e., $R_S$) with the greater value in the processing module on its immediate left (i.e., $I_L$) to determine whether the processing module 150 is to swap values with neither, either, or both of its neighbors. Generally, if the greater value in the processing module 150 is greater than the lesser value in the processing module on its immediate right ($R_B > I_R$), these two values are swapped between the processing modules. If the lesser value in the processing module 150 is less than the greater value in the processing module (or controller 56) on its immediate left ($R_S > I_L$), these two values are swapped between the processing modules.

Taking into consideration any swapping of values, the comparator and logic circuitry 158 also compares and conditionally swaps the values in the $R_S$ and $R_B$ registers to ensure that register $R_S$ holds the lesser and register $R_B$ holds the greater of the two values held by the processing module 150. FIG. 10C provides a table showing the different possible rankings among the values (i.e., under the "condition" header) and the new contents of the registers $R_S$ and $R_B$ that result for each condition.

The comparator and logic circuitry 158 is in communication with the multiplexer network circuitry 156 to communicate the results of the various comparisons and conditional value swaps, and the multiplexer network circuitry 156 updates the new values for registers $R_S$ and $R_B$ in the current clock cycle.

Figure 11:
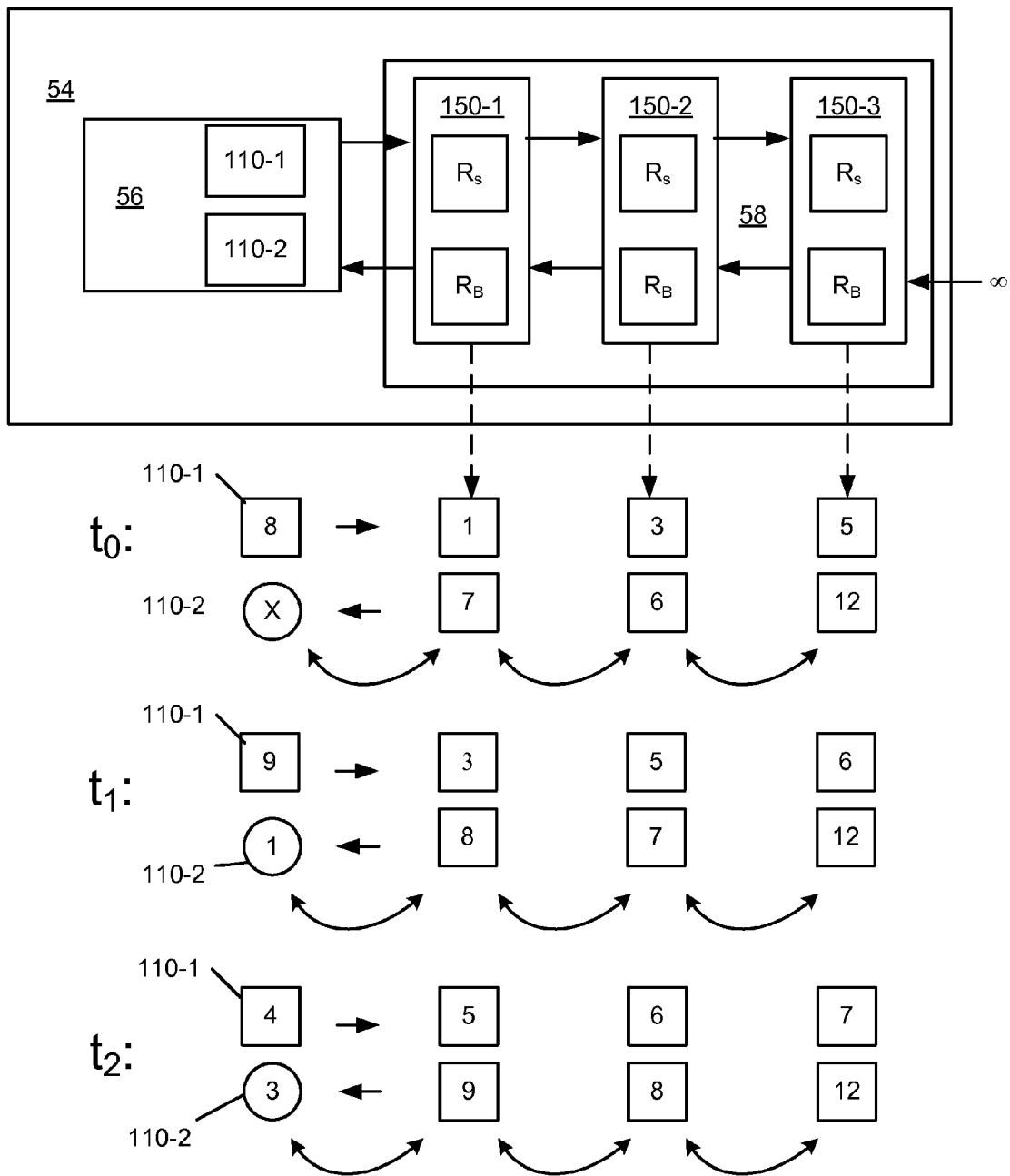
FIG. 11 is a block diagram of an embodiment of a systolic merge sorter operating in continuous mode and using three processing modules of the kind shown in FIG. 10A to perform a 7-way K-way merge sort.

FIG. 11 shows another embodiment of a systolic merge sorter 54 including the controller 56 and a systolic array 58 having a pipeline of three processing modules 150-1, 150-2, 150-3 (generally, 150) of the kind shown in FIG. 10A, FIG. 10B, and FIG. 10C. The circuitry of the three processing modules 150 is identical to one another. Each processing module 150 has two registers for holding two values, a register $R_S$ for holding the lesser of the two values and a register $R_B$ for holding the greater of the two values. In each processing module 150, the register $R_B$ appears below the register $R_S$, as shown in FIG. 10B.

This particular embodiment of the systolic merge sorter 54 demonstrates sorting behavior when operating in the continuous mode (second stage) of a K-way merge sort. In this example, K is equal to seven (i.e., corresponding to the seven data items: one being held by the controller 56 and six being held in the six registers of the three processing modules 150). During the continuous mode, this systolic merge sorter 54 performs 7-way merge sorting of seven sorted subsequences. Initially, the controller 56 serially presents with one data item to the systolic array 58 from each of the seven sorted subsequences (the one of least value in each subsequence), with the controller 56 holding the last of the seven presented data items.

During each clock cycle, the controller 56 presents one data item as input to and obtains one data item as output from the systolic array 58 (except when the controller 56 has the data item of least value). The systolic array 58 performs conditional swaps between neighboring pairs of processing modules 150 in accordance with that described in table of FIG. 10C (for the leftmost processing module 150-1, the controller 56 is its left neighbor with which to swap values conditionally; for the rightmost processing module 150-3, an "infinity" input from the right indicate that the rightmost processing module does not swap to the right). A given processing module 150 can swap zero, one, or two data items in any given clock cycle (lacking a second neighbor, the rightmost processing module swaps zero or one data item).

Consider, for example, that at time $t_0$ the values of the data items within the registers of the processing modules 150 are as shown: the registers $R_S$ and $R_B$ of processing module 150-1 holds values of 1 and 7, respectively; those of processing module 150-2, values of 3 and 6; and those of processing module 150-3, values of 5 and 12. In addition, the input register 110-1 of the controller 56 holds a data item equal to eight. As illustrated, these initially loaded values may not yet be in sorted order across the pipeline of processing modules 150 of the systolic array 58 when the controller 56 has the 7th data item.

Referring to processing module 150-1 as an illustrative example, during the clock cycle of time $t_0$, the processing module 150-1 sees the data item value held in the input register 110-1 of the controller 56 and the lesser of the two values held in the processing module 150-2. In addition, the processing module 150-1 presents the greater value in its register $R_B$ to the processing module 150-2 and the lesser value in its register $R_S$ to the controller 56. The processing module 150-1 also determines the relative rankings among the values received and presently in the registers $R_S$ and $R_B$, and determines which values to swap.

At time $t_0$, the contents of the registers $R_S$ and $R_B$ of each processing module 150 update based on the comparisons made during time $t_0$ and in accordance with the conditions table shown in FIG. 10C. In overview, greater values migrate rightwards in the systolic array 58 while lesser values migrate leftwards, and the least value in the systolic array 58 emerges as output. For instance, here, during time $t_0$ the controller 56 and processing module 150-1 swap values (8 and 1), with the data item equal to one becoming available for output in the next clock cycle; the processing modules 150-1 and 150-2 swap values (3 and 7); and the processing modules 150-2 and 150-3 swap values (6 and 5). In addition, the processing module 150-1 places its current lesser value in register $R_S$ and its current greater value in register $R_B$.

During time $t_1$, each processing module 150 compares the new values held in its new registers $R_S$ and $R_B$ and the new values $I_L$ and $I_R$ received from its neighbors. Processing module 150-1 sees a new data item from the controller 56; this input data item (=9) came from the same subsequence as the output data item (=1). As previously described, the address of the subsequence that each data item comes from can be stored along with that data item and be used to identify the subsequence for purposes of obtaining the next input data item.

The contents of the registers $R_S$ and $R_B$ of each processing module 150 update based on comparisons made during time $t_1$. The controller 56 and processing module 150-1 exchange values (9 and 3), with the data item equal to three to be output in the next clock cycle; the processing modules 150-1 and 150-2 exchange values (8 and 5); and the processing modules 150-2 and 150-3 exchange values (7 and 6). Again, each processing module 150 places its current lesser value in register $R_S$ and its current greater value in register $R_B$.

Similarly, at time $t_2$, each processing module 150 compares the new values held in its registers $R_S$ and $R_B$ and the new values $I_L$ and $I_R$ received from its neighbors. Specifically, the processing module 150-1 receives a new data item (=4) from the controller 56. This new input data item (=4) came from the same subsequence as the data item (=3) that was output in the present clock cycle.

Figure 12:
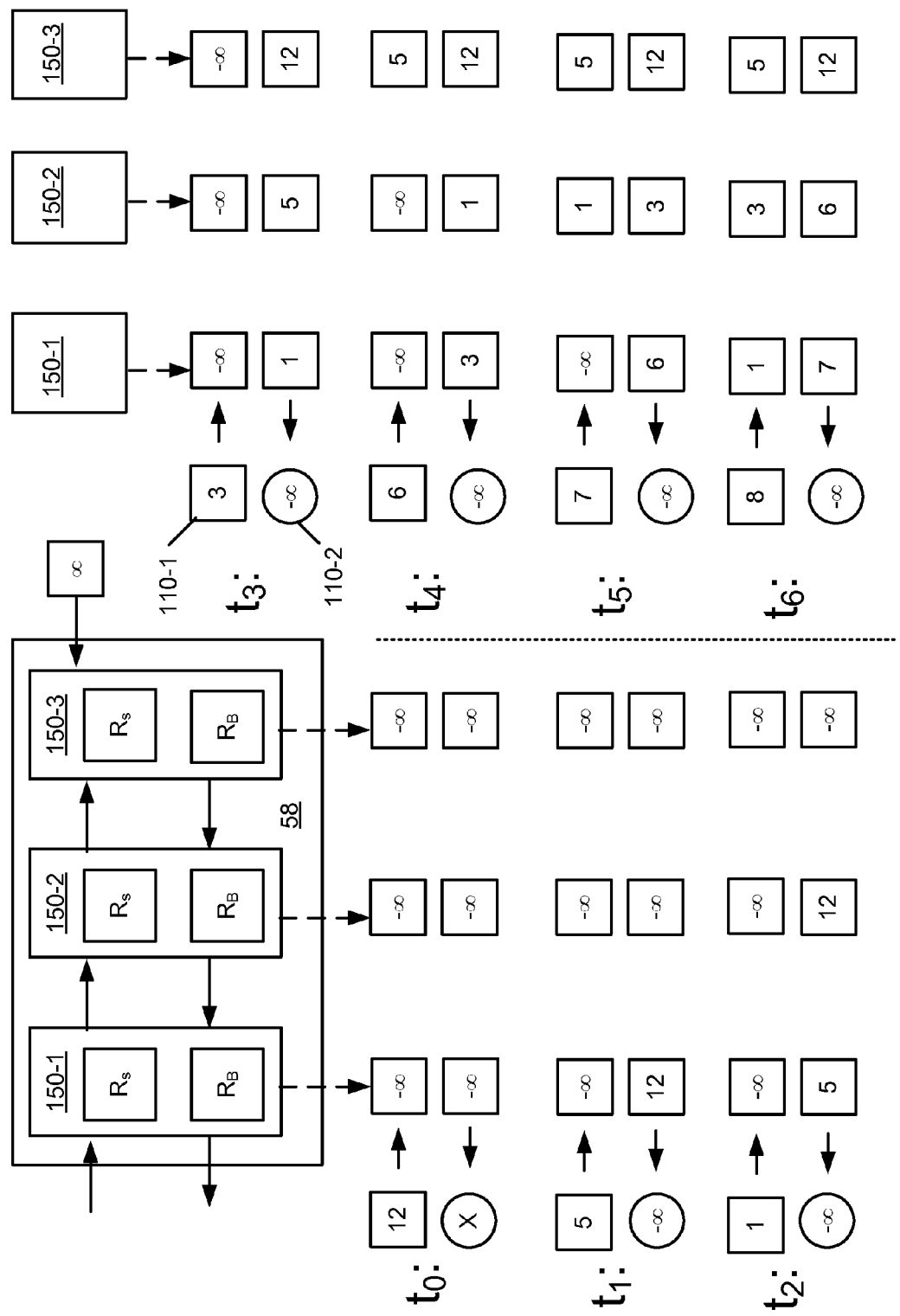
FIG. 12 is a block diagram of the embodiment of the systolic array of FIG. 11 during a process of filling with data items.

FIG. 12 shows the systolic array 58 and processing modules 150 of FIG. 11, and illustrates a first stage process of filling the registers $R_S$ and $R_B$ of each processing module 150 with data items. Both registers $R_S$ and $R_B$ of each processing module 150 are initially filled with the second type of marked data item (e.g., negative infinity), such as described above in connection with FIG. 8.

On each clock cycle, the controller 56 presents a new data item as input to the systolic array 58. All comparisons between the data item provided by the controller and a marked data item in the processing module 150-1 result in a value swap. The new data item shifts into the systolic array, while the systolic array 58 outputs a marked data item. The outputted marked data item may be ignored. The filling of the systolic array 58 completes in seven clock cycles $t_0$ through $t_6$ (K=7).

When the filling completes, the least value held within the systolic array 58 is in the leftmost processing module 150-1, whereas the greatest value within the systolic array 58 is in the rightmost processing module 150-3. Conceivably, the input register 110-1 of the controller 56 can have a lesser value than that in the leftmost processing module 150-1 or a greater value than that in the rightmost processing module 150-3. In the instance of being the least value, the data item held by the input register 110-1 of the controller 56 becomes the first data item delivered as output when the systolic array starts the emptying process. In the instance of being the greatest value, that data item moves towards the right of the array pipeline during the emptying process of the systolic array, and becomes the last data item emerging as output.

Although the data items may not yet be in sorted order after all registers of the processing modules 150 are filled, the sorting behavior of the processing modules operates to output the data items in sorted order upon emptying the systolic array 58. Thus, it is the combined processes of filling and emptying that sort an unsorted subsequence to produce a sorted subsequence.

Figure 13:
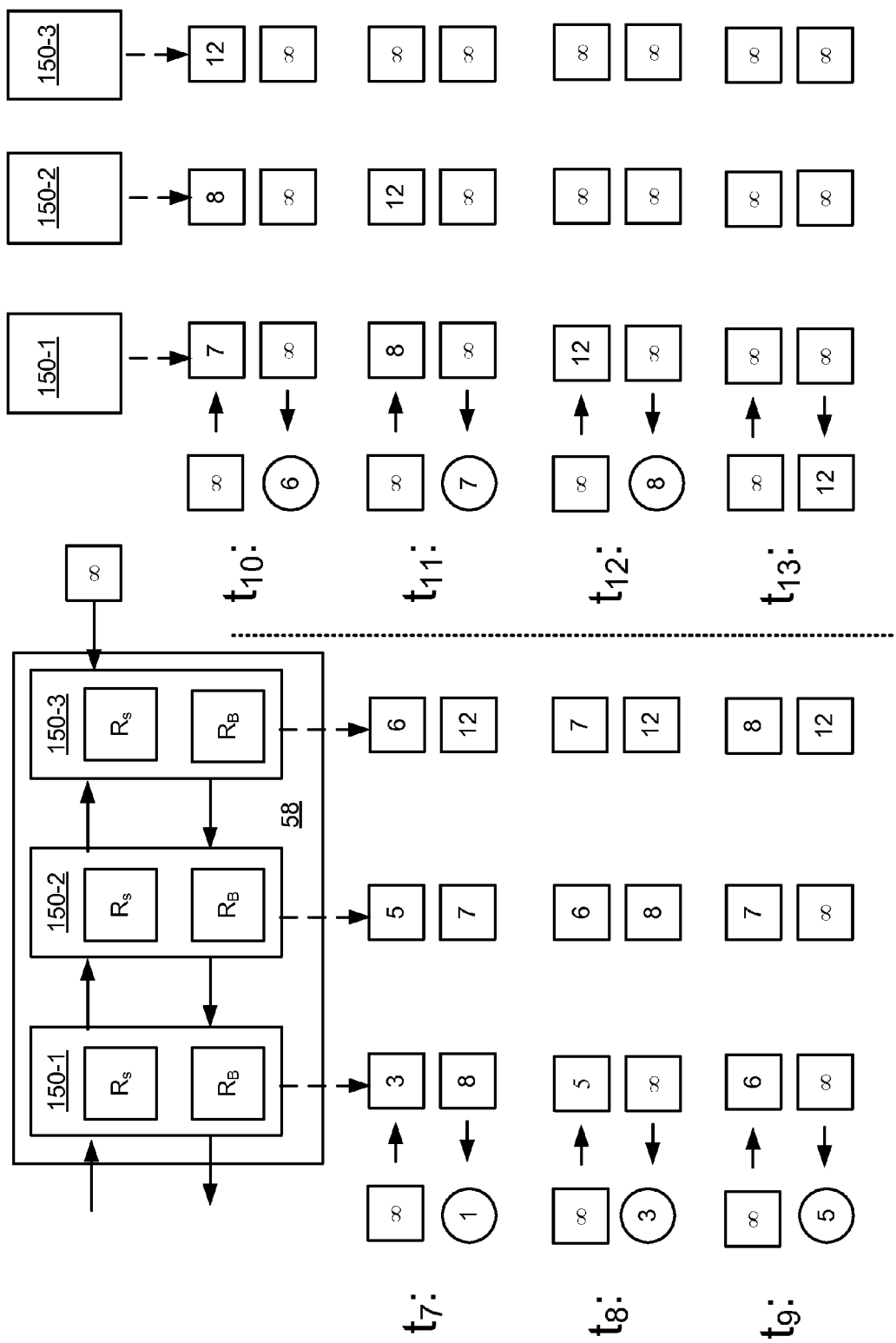
FIG. 13 is a block diagram of the embodiment of the systolic array of FIG. 11 during a process of emptying of data items.

FIG. 13 shows the first stage process of emptying the three processing modules 150-1, 150-2, 150-3 of data items. The process of emptying begins at time $t_7$ to indicate that the process of emptying the systolic array 58 can occur immediately after completion of the process of filling described in FIG. 12 (i.e., on the next clock cycle). The systolic array 58 empties in seven cycles (K=7), with the data items emerging in non-decreasing order.

Using this method, the systolic array can sort K elements in 2*K clock cycles, resulting in 2 clock cycles per entry. Although this rate is twice that of the one clock cycle per data item achieved when the systolic merge sorter 54 operates in continuous mode (FIG. 11), its effect on the overall performance of K-way merge sorting of long sequences is minimal because the number of K-way merge-sorts (stage two) well exceed the number of initial sorting of K subsequences, each having K data items (stage one).

As an alternative to operating in accordance with the table of FIG. 10C, the processing modules 150 of FIG. 10A can be configured to operate in accordance with the tables of FIG. 14A and FIG. 14B during the first stage. The table of FIG. 14A sets forth the conditions that define the operational behavior of the processing modules 150 when the systolic array is being filled with data items, and the table of FIG. 14B sets forth the conditions that define the operational behavior of the processing modules 150 when the systolic array is being emptied of data items.

Figure 15:
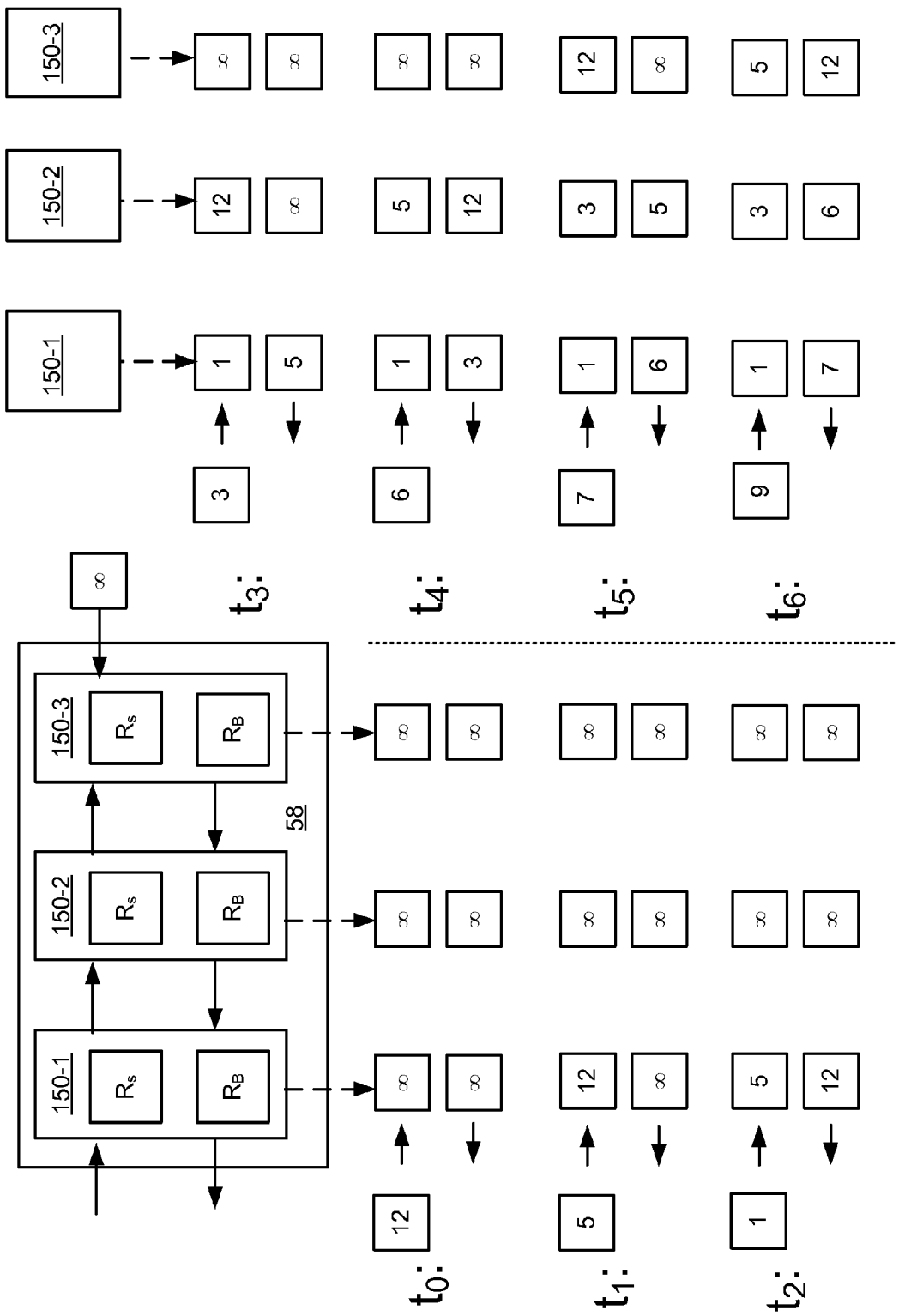
FIG. 15 is a block diagram of an embodiment of a systolic array with three processing modules of FIG. 10A filling with data items in accordance with the functional behavior described in the table of FIG. 14A.

FIG. 15 illustrates this process of filling the systolic array 58 in accordance with the table of FIG. 14A. The illustrative embodiment of a systolic array 58 has three processing modules 150-1, 150-2, 150-3 arranged in a pipeline. Each processing module 150 has two registers $R_S$ and $R_B$. Initially, the registers $R_S$ and $R_B$ of every processing module 150 are flagged or filled with the first type of marked data item (here, signified by infinity).

During the filling process of this embodiment of systolic array, the register $R_S$ of a given processing module 150 receives an input data item before its register $R_B$ can receive one, and both registers $R_S$ and $R_B$ hold an inputted data item before the processing module can pass its greater value held in register $R_B$ to its right neighbor. Sorting occurs within each processing module by virtue of the register $R_S$ holding the lesser value and the register $R_B$ holding the greater value, although value swapping for purposes of sorting does not occur between neighboring pairs of processing modules. When all registers of the systolic array are full of data items, the register $R_S$ of the leftmost processing module 150-1 in the pipeline holds the data item of least value in the systolic array. (As previously noted, the controller 56 may be holding a data item of lesser value than the one in the leftmost processing module 150-1). The filling of the systolic array completes in seven clock cycles $t_0$-$t_6$ (K=7).

This operational behavior is reflected in the table of FIG. 14A: (1) if both registers $R_S$ and $R_B$ are empty when an processing module receives a value ($I_L$) from its left neighbor, the new contents of register $R_S$ become those of the value $I_L$, while those of register $R_B$ remains empty; and (2) if register $R_S$ already has a value and that value is greater than or equal to $I_L$, the new contents of register $R_S$ become $I_L$, while those of register $R_B$ remain unchanged, otherwise the new contents of register $R_B$ become equal to $I_L$, while those of register $R_S$ remain unchanged.

Figure 16:
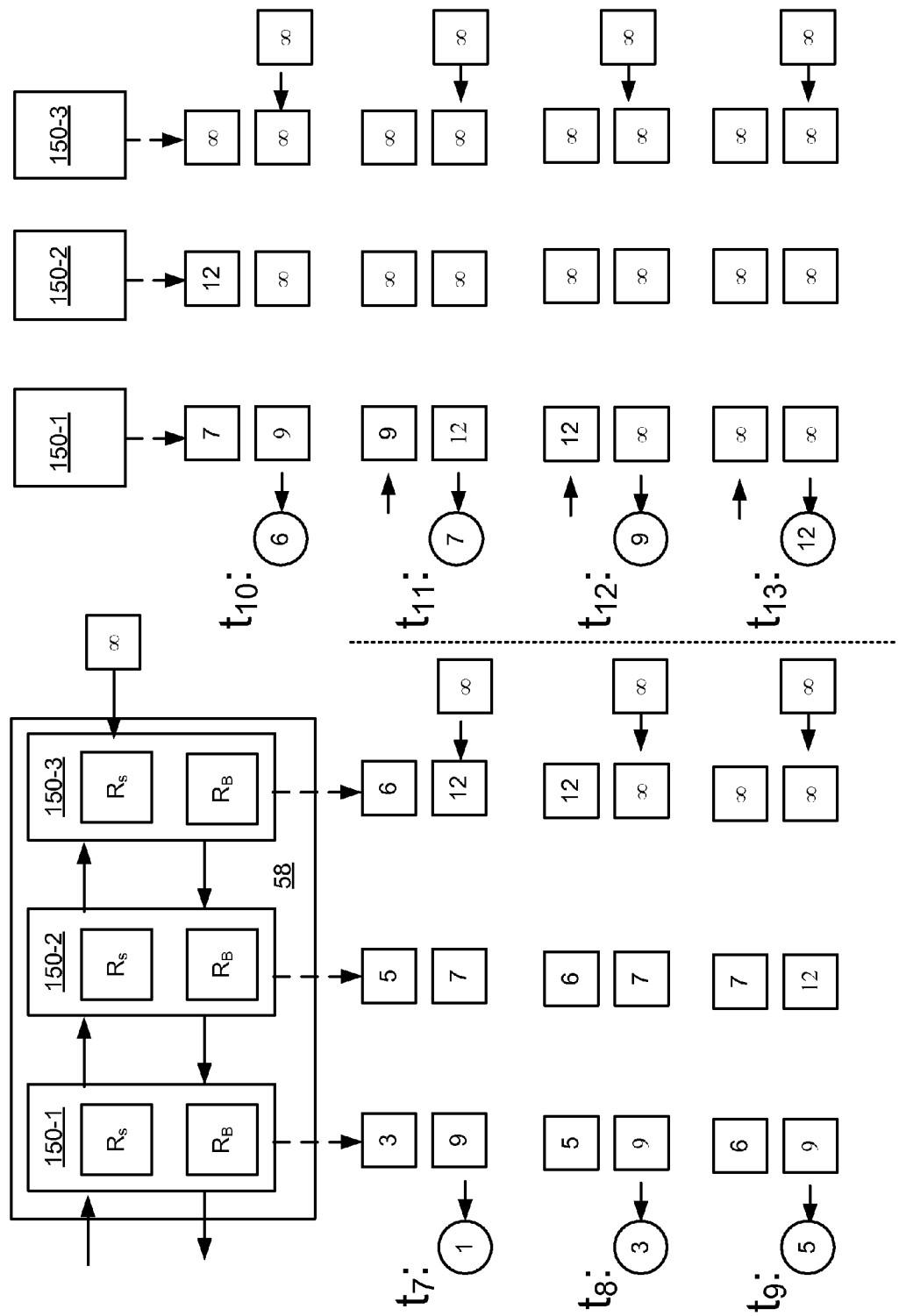
FIG. 16 is a block diagram of an embodiment of a systolic array with three processing modules of FIG. 10A emptying of data items in accordance with the functional behavior described in the table of FIG. 14B.

FIG. 16 illustrates this process of emptying the systolic array 58 in accordance with the table of FIG. 14B. The emptying process begins during the next clock cycle (i.e., $t_7$) after the filling process ends. During each clock, a marked data item of the first type (e.g., infinity) is passed (as $I_R$) to the rightmost processing module 150-3. Again, sorting occurs within each processing module 150 by virtue of the register $R_S$ holding the lesser value and the register $R_B$ holding the greater value, and value swapping for purposes of sorting does not occur between neighboring pairs of processing modules. In addition, each processing module 150 passes the contents of its register $R_S$ to its left neighbor: the data item emerging from the register $R_S$ of the leftmost processing module 150-1 is the least value in the systolic array 58. Subsequently outputted data items emerge in non-decreasing order. The sorted subsequence emerges completely in seven clock cycles $t_7$-$t_{13}$ (K=7).

This operational behavior is reflected in the table of FIG. 14B: (1) if register $R_B$ is empty (e.g., infinity) when a value ($I_R$) arrives at an processing module from its right neighbor, the contents of register $R_S$ and $R_B$ both are or become empty; (2) if the value ($I_R$) is equal to empty (i.e., marked), then the contents of register $R_S$ become the old value of $R_B$ and the contents of $R_B$ become empty; and (3) if register $R_B$ has a value that is less than or equal to $I_R$, the new contents of register $R_B$ become $I_R$ and those of register $R_S$ become the old contents of register $R_B$, otherwise the new contents of register $R_S$ become equal to $I_S$, while those of register $R_B$ remain unchanged.

Figure 17:
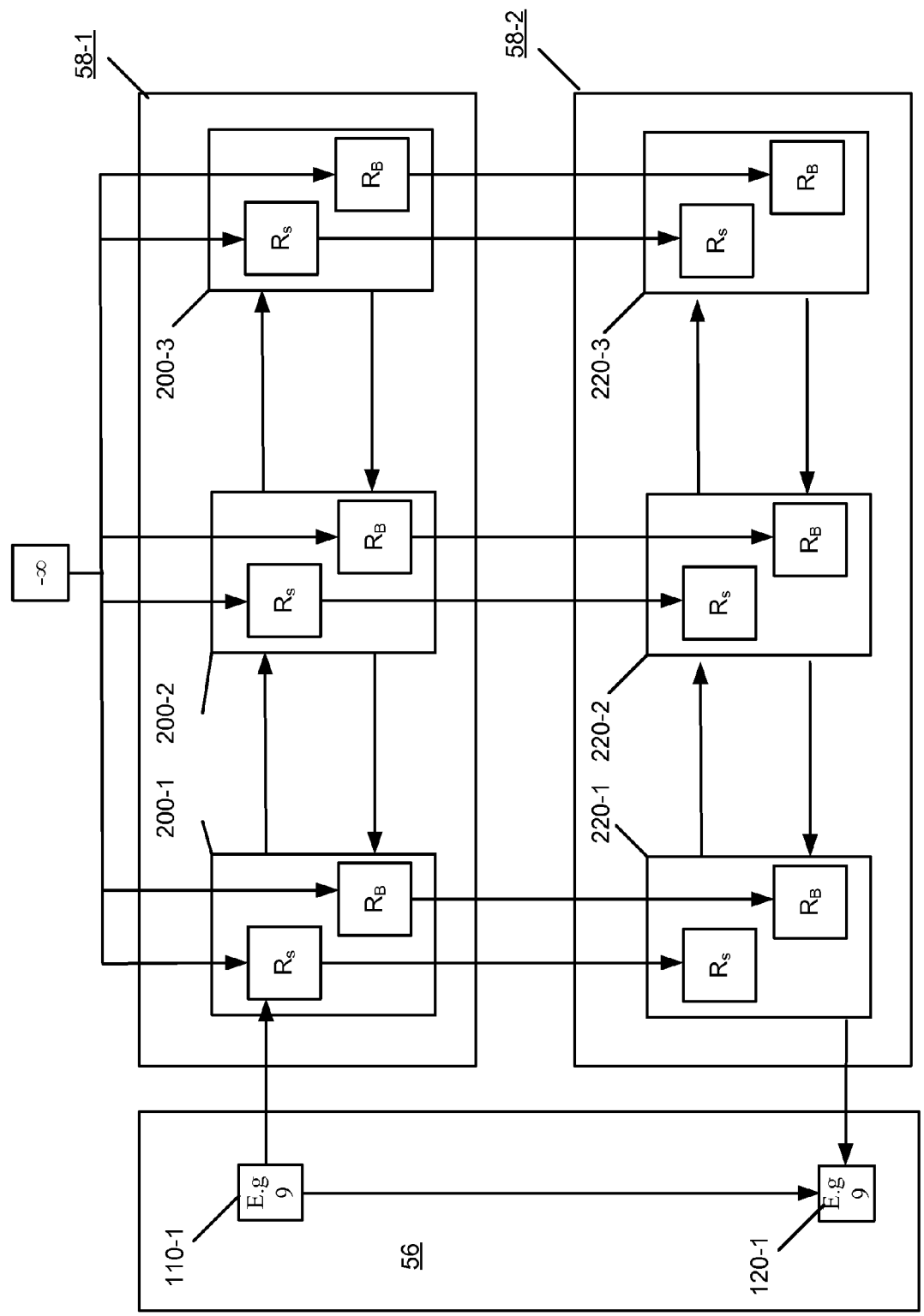
FIG. 17 is a block diagram of an embodiment of a systolic merge sorter that includes an input systolic array and an output systolic array.

An improvement in throughput for stage one processing, from 2 clock cycles per data item to approximately 1 clock cycle per data item, can be achieved by dedicating a first systolic array for receiving input data items and a second systolic array for outputting data items. FIG. 17 shows one such embodiment of a systolic merge sorter 54 that includes an input systolic array 58-1 and an output systolic array 58-2. In this example, the input systolic array 58-1 has a pipeline of three processing modules 200-1, 200-2, 200-3 (generally, 200) and the output systolic array 58-2 has a pipeline of three processing modules 220-1, 220-2, 220-3 (generally, 220). Each processing module 200, 220 has a register $R_S$ (lesser value) and a second register $R_B$ (greater value). Each processing module 200 of the input systolic array 58-1 is in communication with a corresponding processing module 220 of the output systolic array 58-2, by which that processing module 200 can pass its register values to its corresponding processing module 220.

The different embodiments of can be combined in a single systolic merge sorter for stage one processing (input and output modes). For instance, the input systolic array 58-1 can fill in accordance with the table of FIG. 10C, while the output systolic array 58-2 empties according to the table of FIG. 14B; or the input systolic array 58-1 can fill in accordance with the table of FIG. 14A, while the output systolic array 58-2 empties according to the table of FIG. 10C. Other embodiments are for both the input and output systolic arrays 58-1, 58-2 to operate according to the table of FIG. 10C; or for the input systolic array 58-1 to operate according to FIG. 14A, while the output systolic array 58-2 operates according to FIG. 14B.

The process of filling the input systolic array 58-1 occurs as described in connection with FIG. 12 or with FIG. 15. The registers of the systolic array 58-1 fill completely in K cycles (here, K=7). On the next clock cycle (here, the 8th cycle), the contents of the registers of the input systolic array 58-1 transfer to the corresponding registers of the output systolic array 58-2.

In addition, during this next clock cycle (still, the 8th clock cycle), all registers of the input systolic array 58-1 fill with a marked data item of the second type (negative infinity), and the input register 110-1 of the controller 56 fills with a first data item from the next set of unsorted K data items corresponding to the next of the K subsequences to be sorted. Being filled with marked data items, the input systolic array 58-1 is ready to start receiving data items from next subsequence beginning with the next clock cycle (i.e., the 9th cycle).

Also in the clock cycle of the value transfer (i.e., the 8th clock cycle) a first output data item becomes available in the output register 110-2 of the controller 56. This value transfers from the input register 110-1 of the controller 56 to the output register 110-2. Thus, the data item of least value is output on the next clock cycle after the input systolic array is presented the Kth data item.

Upon each subsequent clock cycle, the controller 56 presents a new input data item to the input systolic array 58-1 and receives another output data item of least value from the output systolic array 58-2. Data items serially emerge from the output systolic array operates, as described in connection with FIG. 13 or with FIG. 16.

With the embodiment of systolic merge sorter of FIG. 17, one subsequence of K data items sorts in 2*K clock cycles, two subsequences of K data items sort in 3*K clock cycles, and 1000 subsequences of K data items sort in 1001*K clock cycles. The greater the number of subsequences that require sorting, the closer the throughput approaches one clock cycle per data item.

Figure 18:
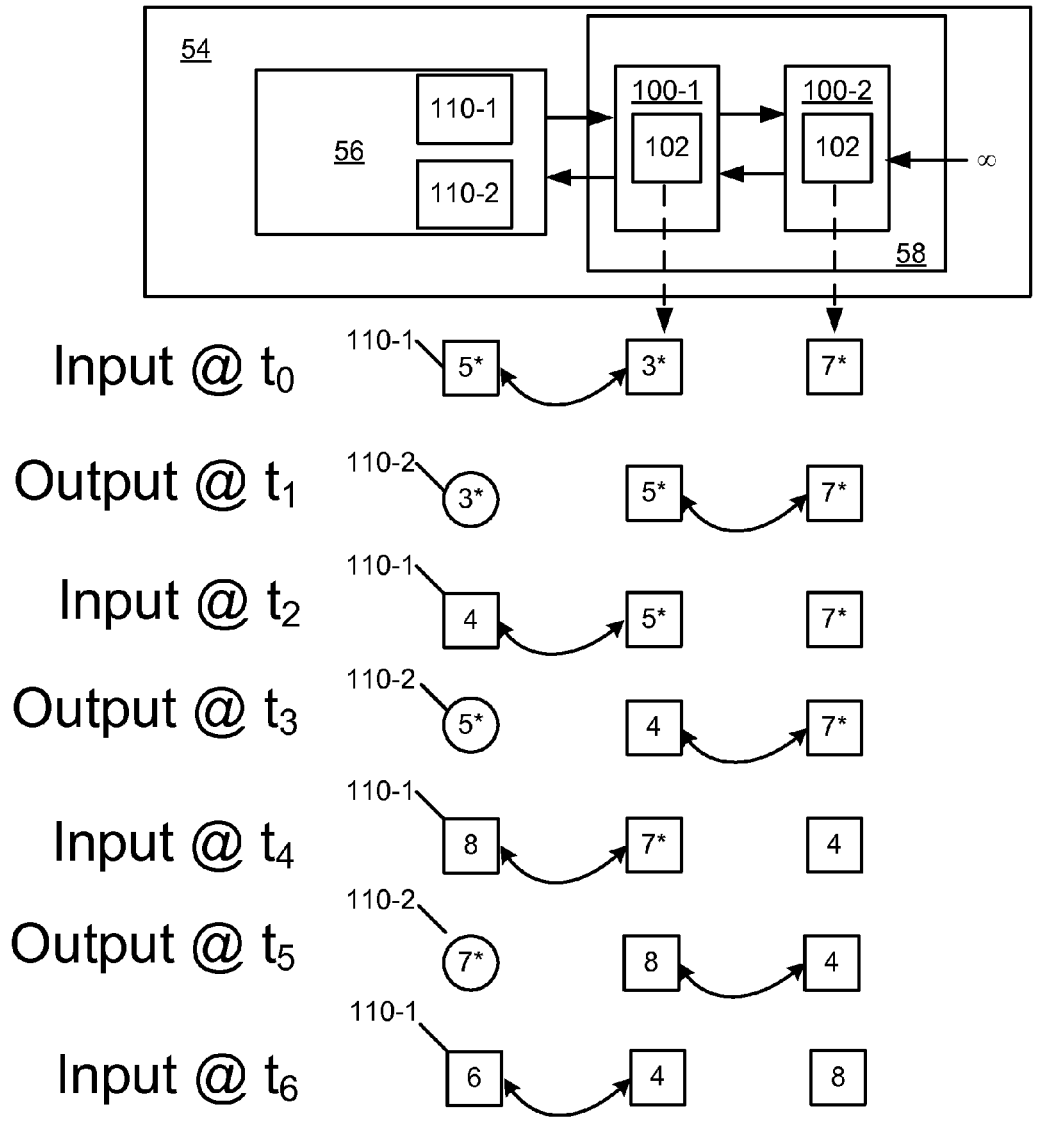
FIG. 18 is a block diagram of the embodiment of systolic merge sorter of FIG. 8 and FIG. 9, having increased sorting throughput during the filling and emptying processes.

FIG. 18 shows another embodiment of a systolic merge sorter that improves throughput for stage one processing. In this embodiment, when the controller 56 presents the last of the K data items to the systolic array, each of the K data items is flagged. Each processing module considers a flagged data item to have a lesser value than all newly inputted data items. The systolic array continues to sort as described in connection with FIG. 8.

For example, consider that at time $t_0$ the systolic array becomes filled with data items from a first subsequence being sorted. When the systolic array becomes full, each data item, including the data item in the controller 56, is flagged.

At time $t_1$ the controller 56 receives the data item of least value as output from processing module 100-1, while the processing module 100-1 and the processing module 100-2 compare their data items to determine whether to swap values. At time $t_2$, the controller 56 presents a first data item (here, equal to four) of the next subsequence of three (K=3) items to be sorted. This newly inputted data item is compared with a flagged data item of the previous subsequence held in the leftmost processing module 100-1. Treated as less in value than the newly inputted data item, the flagged data item becomes the next outputted data item, as indicated at time $t_3$. Flagged data items thus exit the systolic array as newly inputted data items enter. By time $t_5$, the last of the three data items of the first subsequence has emerged. On the next clock cycle, $t_6$, the controller 56 presents the last of the three data items of the second subsequence to the systolic array 58, and flags these three data items.

With the embodiment of systolic merge sorter of FIG. 18, one subsequence of three data items sorts in 10 (2*K+4) clock cycles, two subsequences of 3 data items sort in 16 (4*K+4) clock cycles; three subsequences of 3 data items sort in 22 (6*K+4) clock cycles; and 1000 subsequences of 3 data items sort in 6004 (2000*K+4) clock cycles. The greater the number of subsequences that require sorting, the closer the throughput approaches two clock cycles per data item.

Instead of flagging each data item at the time when the systolic array 58 becomes filled, each data item can already be associated with a binary flag when that data item arrives at the input register 110-1 of the controller 56. The value of the binary flag alternates between subsequences of data items. For example, consider a 3-way merge sort involving six subsequences ($S_0$, $S_1$, $S_2$, $S_3$, $S_4$, and $S_5$), each comprised of three data items. The three data items of subsequences $S_0$, $S_2$, and $S_4$ have their flags set to zero, whereas the three data items of subsequences $S_1$, $S_3$, and $S_5$ have their associated flags set to one. Processing modules keep track of the current flag value (i.e., of those data items for the subsequence currently being outputted in sorted order). Each processing module 100 treats an inputted data item arriving from its left neighbor to belong to the next subsequence to be sorted if the flag value associated with that data item is different from the current flag value. The data items of the next subsequence are treated as having greater value than the data items of the subsequence currently being outputted.

Figure 19:
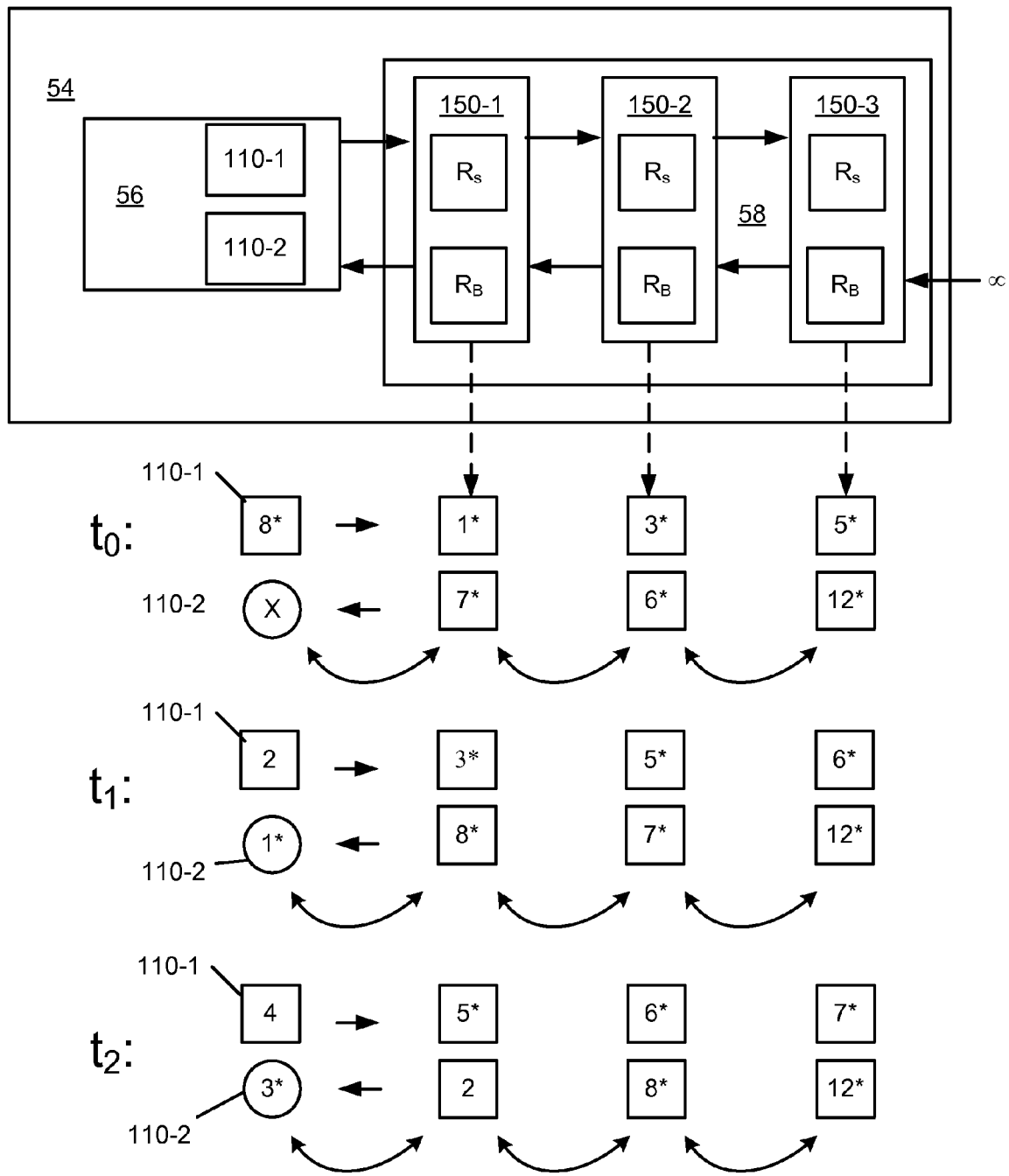
FIG. 19 is a block diagram of the embodiment of systolic merge sorter of FIG. 11, having increased sorting throughput during the filling and emptying processes.

FIG. 19 shows another embodiment of a systolic merge sorter that improves throughput for stage one processing, wherein each processing module 150 has two registers. Like the embodiment described in connection with FIG. 18, when the controller 56 presents the last of the K data items to the systolic array, (here at time $t_0$), each of the K data items is flagged. Each processing module subsequently considers a flagged data item to have a lesser value than all newly inputted data items, such as illustrated at time $t_1$, where the newly input data item of value equal to two is considered greater than the flagged data item of value equal to five. The systolic array continues to sort as described in connection with FIG. 11 or FIG. 15, until the flagged set of K data items emerge from the systolic array. At that time, the new set of K data items are flagged and are subsequently considered to have a lesser value than all subsequently inputted data items.

Alternatively, each data item can be flagged with a binary flag (described in connection with FIG. 18) before the data items fill the systolic array 58. Again, the value of the binary flag alternates between unsorted subsequences of data items. The processing modules 150 keep track of the current flag value (i.e., of those data items for the subsequence currently being outputted in sorted order). Each processing module 150 treats an inputted data item arriving from its left neighbor to belong to the next subsequence to be sorted if the flag value associated with that data item is different from the current flag value. The data items of the next subsequence are treated as having greater value than the data items of the subsequence currently being outputted. After all data items of the current subsequence emerge from the systolic array, the processing modules 150 change the current flag value to that of the data items just loaded into and currently in the systolic array.

Figure 20:
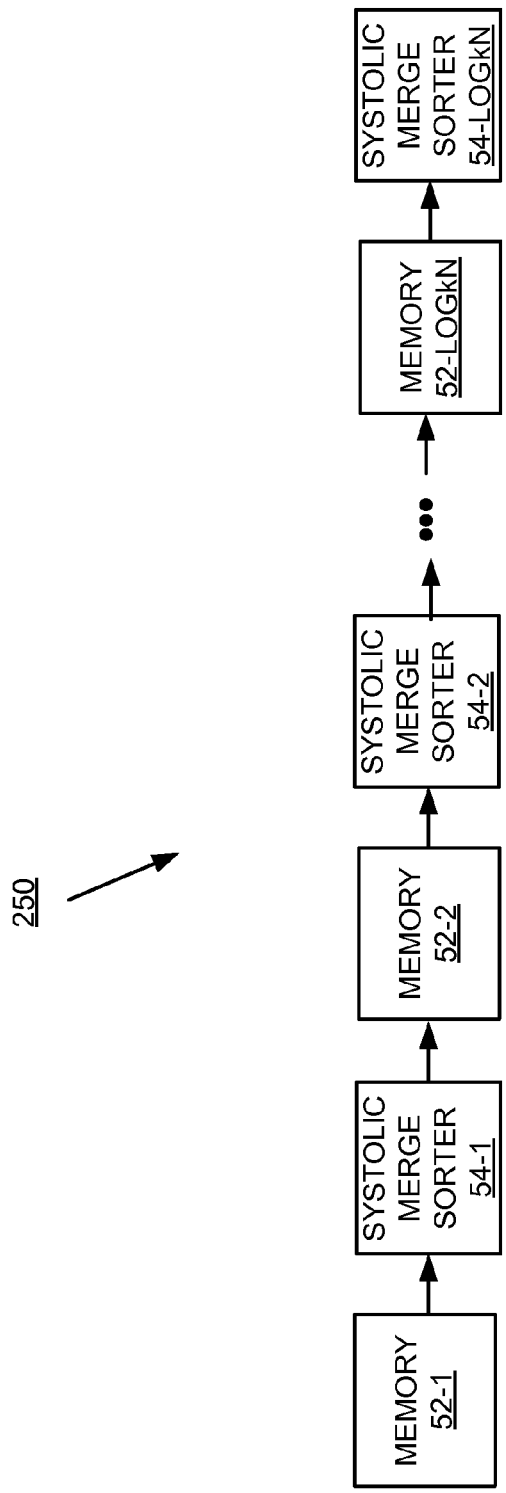
FIG. 20 is a block diagram of a pipeline for improving merge sorting throughput comprised of successive pairs of memory and systolic merge sorters.

Another mechanism for increasing throughput is to arrange multiple K-way merger sorters 54 in pipeline fashion, as shown in FIG. 20. The embodiment of such a pipeline 250 includes successive pairs of memory 52 and systolic merge sorters 54. Within the pipeline, each systolic merge sorter performs one stage of a K-way merge-sort processing. The pipeline 250 can have as many as $\log_K n$ stages of systolic merge sorters. If the pipeline 250 has fewer than $\log_K n$ systolic merge sorters, each systolic merge sorter can perform more than 1 round of K-way merge sorting.

For example, consider that the initial sorting of unsorted subsequences produces hundreds of thousands of sorted subsequences, each having K data items. The first systolic merge sorter 54-1 in the pipeline operates in the continuous mode to K-way merge sort the first set of K sorted subsequences. The results of the systolic merge sorter 54-1 pass to memory 52-2 as a single sorted subsequence. After the first systolic merge sorter 54-1 has produced and stored K of such sorted subsequences into memory 52-2, the second systolic merge sorter 54-2 can begin K-way merge sorting these subsequences. After the pipeline is full, increased throughput results from the parallel processing of the various systolic merger sorters.

For embodiments of systolic merge sorters 54 that employ systolic arrays fashioned like those described in FIG. 5 and FIG. 11, the initial K-way merge sort performed by the systolic merger sorter 54-1 can limit computational throughput. To increase throughput, multiple systolic merge sorters can be employed in parallel at the initial systolic merge-sorter stage. In general, multiple systolic merge sorters can be used in parallel to speed up the sorter throughput for any round of merge sorting, or for even when the sorting occurs one round at a time as shown in FIG. 4. Such implementations use faster memory or multiple memory banks.

In some applications, the systolic merge sorter may need to sort the indexes associated with each of the data items. For such applications, the processing modules of the systolic array can have a data item register associated with each of the index registers that is being sorted. In that case, each data item moves along with its associated index.

While the invention has been shown and described with reference to specific preferred embodiments, it should be understood by those skilled in the art that various changes in form and detail may be made therein without departing from the spirit and scope of the invention as defined by the following claims. For example, instead of swapping data items between a pair of processing modules when the data item of the left processing module is greater than that of the right processing module, another embodiment swaps values if the left data item is greater than or equal to the right data item. Alternatively, if a non-increasing order is desired, swapping occurs if the left data item is less than or equal to the right data item.

What is claimed is:

1. A sorter system comprising:
    a clock continuously generating a series of clock signals;
    a systolic array circuit including at least one processing module and K−1 registers, where K is an integer value greater than two, each processing module having at least one of the registers, each register for storing one data item; and
    control circuitry in communication with serial access memory storing data items of a sequence to be sorted and in communication with the systolic array circuit to supply thereto data items as input and to receive therefrom data items as output, the control circuitry serially presenting K data items for input to the systolic array circuit in synchronization with the clock signals,
    wherein, on the next clock cycle after the control circuitry presents to the systolic array circuit the last of the K data items, the data item of least value of the K data items is outputted.

2. The sorter system of claim 1, wherein the sequence is divided into a plurality of unsorted subsequences each having K data items and wherein the K data items presented to the systolic array circuit belong to one of these unsorted subsequences.

3. The sorter system of claim 2, wherein each of the K data items presented to the systolic array circuit is flagged when the last of the K data items is presented, each flag signifying that the flagged data item belongs to a different unsorted subsequence from that of each input data item subsequently presented to the systolic array circuit.

4. The sorter system of claim 2, wherein each data item is associated with a binary flag before that data item is presented, the flags of the K data items of a given unsorted subsequence having the same binary value, the unsorted subsequences being sorted in serial order, the binary value of the flags of the K data items of the unsorted subsequences alternating every other unsorted subsequence in the serial order.

5. The sorter system of claim 1, wherein each of the K data items presented to the systolic array circuit is first in order within a sorted subsequence of the sequence, each of the sorted subsequences belonging to a group of K subsequences being merge-sorted.

6. The sorter system of claim 5, wherein the control circuitry selects a next data item for input to the systolic array circuit based on the particular sorted subsequence to which the outputted data item belongs.

7. The sorter system of claim 1, wherein the systolic array circuit includes K−1 processing modules arranged in a pipeline, each processing module circuit having one of the K−1 registers for holding one data item, a first one of the K−1 processing module circuits being positioned first in the pipeline and in communication with the control circuitry, and a second of the K−1 processing module circuits being positioned second in the pipeline.

8. The sorter system of claim 7, wherein, during alternating clock cycles, the first one of the K−1 processing module circuits conditionally swaps data items with the control circuitry in one clock cycle and conditionally swaps data items with the second of the K−1 processing module circuits in the next clock cycle.

9. The sorter system of claim 1, wherein the systolic array circuit receives an input data item and produces a sorted output data item in alternating clock cycles.

10. The sorter system of claim 1, wherein the systolic array circuit receives an input data item and produces a sorted output data item in a single clock cycle.

11. The sorter system of claim 1, wherein the systolic array circuit includes two or more processing modules arranged in a pipeline, each processing module having two of the K−1 registers for holding two data items, one of the two registers holding the data item of lesser value of the two data items and the other of the two registers holding the data item of greater value of the two data items.

12. The sorter system of claim 11, wherein, during each clock cycle, one of the processing modules receives a data item from and presents a data item to each neighbor, and compares the data items in its two registers with each received data item to determine a ranking among the data items and whether to swap data items with each neighbor.

13. The sorter system of claim 11, wherein the systolic array circuit is an input systolic array circuit and further comprising an output systolic array circuit in communication with the input systolic array circuit, wherein, on the next clock cycle after the control circuitry presents to the input systolic array circuit the last of the K data items, the data items in the input systolic array circuit simultaneously transfer to the output systolic array circuit.

14. A computer-executed method of merge sorting a sequence having a large number of data items, the method comprising:
    continuously generating a series of clock signals;
    serially presenting K data items for input to a systolic array circuit in synchronization with the clock signals, the systolic array circuit including at least one processing module circuit and K−1 registers, where K is an integer value greater than two;
    conditionally exchanging data items between registers of the systolic array circuit during each clock cycle in which the K data items are serially presented to the systolic array circuit; and
    outputting the data item of least value of the K data items on the next clock cycle after the last of the K data items is presented to the systolic array circuit.

15. The computer-executed method of claim 14, further comprising dividing the sequence into a plurality of unsorted subsequences each having K data items, and wherein the K data items presented to the systolic array circuit belong to one of these unsorted subsequences.

16. The computer-executed method of claim 15, further comprising flagging each of the K data items presented to the systolic array circuit when the last of the K data items is presented, each flag signifying that the flagged data item belongs to a different unsorted subsequence from that of each input data item subsequently presented to the systolic array circuit.

17. The computer-executed method of claim 15, further comprising:
    associating a binary flag with each data item before that data item is presented, the flags of the K data items of a given unsorted subsequence having the same binary value;
    sorting the unsorted subsequences in serial order; and
    alternating the value of the binary flag upon every other unsorted subsequence in the serial order.

18. The computer-executed method of claim 14, wherein each of the K data items presented to the systolic array circuit is first in order within a sorted subsequence of the sequence, each of the sorted subsequences belonging to a group of K subsequences being merge-sorted.

19. The computer-executed method of claim 18, further comprising selecting a next data item for input to the systolic array circuit based on the particular sorted subsequence to which the outputted data item belongs.

20. The computer-executed method of claim 14, wherein the systolic array circuit includes K−1 processing modules arranged in a pipeline, each processing module having one of the K−1 registers for holding one data item, a first one of the K−1 processing modules being positioned first in the pipeline, and a second of the K−1 processing modules being positioned second in the pipeline.

21. The computer-executed method of claim 20, further comprising conditionally swapping, during alternating clock cycles, data items between the first one of the K−1 processing module circuits and control circuitry in one clock cycle and data items between the first and second of the K−1 processing module circuits in the next clock cycle.

22. The computer-executed method of claim 14, further comprising receiving an input data item and producing an output data item by the systolic array circuit in alternating clock cycles.

23. The computer-executed method of claim 14, further comprising receiving an input data item and producing an output data item by the systolic array circuit in a single clock cycle.

24. The computer-executed method of claim 14, wherein the systolic array circuit includes two or more processing module circuits arranged in a pipeline, each processing module circuit having two of the K−1 registers for holding two data items, one of the two registers holding the data item of lesser value of the two data items and the other of the two registers holding the data item of greater value of the two data items.

25. The computer-executed method of claim 24, further comprising receiving, by each processing module circuit, a data item from each neighboring processor module circuit during each clock cycle, and comparing, by that processing module circuit, the data items in its two registers with each received data item to determine a ranking among the data items and whether to swap data items with each neighbor processor module circuit.

26. The computer-executed method of claim 14, wherein the systolic array circuit is an input systolic array circuit and further comprising an output systolic array circuit in communication with the input systolic array circuit, and further comprising simultaneously transferring the data items in the input systolic array circuit to the output systolic array circuit on the next clock cycle after the last of the K data items is presented to the input systolic array circuit.

27. Systolic array circuitry, comprising:
K−1 registers, where K is an integer value greater than two, each register for storing one data item; and
a plurality of identical processing module circuits connected in a pipeline, each processing module circuit being electrically connected to at least one neighboring processing module circuit for exchanging data items therewith, each processing module circuit having at least one of the K−1 registers, a first one of the processing module circuits being first in position in the pipeline and is serially presented K input data items in synchronization with a series of clock signals,
wherein, on the next clock cycle after the first processing module circuit in the pipeline is presented the last of K data items, a register of the first processing module circuit holds a data item of least value of the data items held by the K−1 registers in the systolic array circuitry.

28. The systolic array circuitry of claim 27, wherein each of the K data items presented to the systolic array circuit is first in order within a sorted subsequence of the sequence, each of the sorted subsequences belonging to a group of K subsequences being merge-sorted.

29. The systolic array circuitry of claim 27, wherein the sequence is divided into a plurality of unsorted subsequences each having K data items and wherein the K data items presented to the systolic array circuit belong to one of these unsorted subsequences.

30. The systolic array circuitry of claim 27, wherein the systolic array circuit includes K−1 processing module circuits arranged in a pipeline, each processing module circuit having one of the K−1 registers for holding one data item.

31. The systolic array circuitry of claim 30, wherein, during alternating clock cycles, one of the K−1 processing module circuits conditionally swaps data items with a first neighboring processing module circuit and conditionally swaps data items with a second neighboring processing module circuit in the next clock cycle.

32. The systolic array circuitry of claim 27, wherein the systolic array circuitry receives an input data item and produces a sorted output data item in alternating clock cycles.

33. The systolic array circuitry of claim 27, wherein the systolic array circuitry receives an input data item and produces a sorted output data item in a single clock cycle.

34. The systolic array circuitry of claim 27, wherein the systolic array circuit includes two or more processing module circuits arranged in a pipeline, each processing module circuit having two of the K−1 registers for holding two data items, one of the two registers holding the data item of lesser value of the two data items and the other of the two registers holding the data item of greater value of the two data items.

35. The systolic array circuitry of claim 34, wherein, during each clock cycle, one of the processing module circuits receives a data item from each neighboring processing module circuit, and compares the data items in its two registers with each received data item to determine a ranking among the data items and whether to swap a data item.

36. A merge sorter circuit, comprising:
K−1 registers, where K is an integer value greater than two, each register for storing one data item; and
a plurality of identical processing module circuits connected in a bidirectional pipeline, each processing module circuit being electrically connected to at least one neighboring processing module circuit for exchanging data items therewith, each processing module circuit having at least one of the K−1 registers, a first one of the processing module circuits being first in position in the pipeline and is serially presented K input data items in synchronization with a series of clock signals,
wherein, on each clock signal, the processing module circuits conditionally execute an exchange of data items such that data items of greater values move towards one end of the pipeline while data items of lesser values move towards an opposite end of the pipeline.

* * * * *